(12) United States Patent
Nakajima et al.

(10) Patent No.: US 8,871,833 B2
(45) Date of Patent: Oct. 28, 2014

(54) METALLIC-PIGMENT COMPOSITION

(75) Inventors: Kazuko Nakajima, Tokyo (JP); Kaoru Ueyanagi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 73 days.

(21) Appl. No.: 13/643,352

(22) PCT Filed: Apr. 26, 2011

(86) PCT No.: PCT/JP2011/060155
§ 371 (c)(1),
(2), (4) Date: Dec. 12, 2012

(87) PCT Pub. No.: WO2011/136215
PCT Pub. Date: Nov. 3, 2011

(65) Prior Publication Data
US 2013/0101813 A1 Apr. 25, 2013

(30) Foreign Application Priority Data

Apr. 27, 2010 (JP) ................................ 2010-102459
Jul. 14, 2010 (JP) ................................ 2010-159286

(51) Int. Cl.
| | | |
|---|---|---|
| *C09D 11/00* | (2014.01) | |
| *C09D 7/12* | (2006.01) | |
| *C09C 1/62* | (2006.01) | |
| *C09C 3/06* | (2006.01) | |
| *C09C 3/12* | (2006.01) | |
| *C09D 11/037* | (2014.01) | |
| *C08K 3/08* | (2006.01) | |
| *C08K 9/06* | (2006.01) | |
| *B05D 5/06* | (2006.01) | |

(52) U.S. Cl.
CPC ................ *C09D 7/1216* (2013.01); *C09C 1/62* (2013.01); *C09C 3/06* (2013.01); *C09C 3/12* (2013.01); *C09D 7/1225* (2013.01); *C09D 11/037* (2013.01); *C01P 2006/60* (2013.01); *C08K 3/08* (2013.01); *C08K 9/06* (2013.01); *B05D 5/067* (2013.01)
USPC ............................ 523/160; 523/161; 524/127

(58) Field of Classification Search
CPC .............. C09C 1/62; C09C 3/06; C09C 3/12; C09D 7/1216; C09D 7/1225; C09D 11/037
USPC ................................... 523/160, 161; 524/127
See application file for complete search history.

(56) References Cited

U.S. PATENT DOCUMENTS

| | | | |
|---|---|---|---|
| 4,350,535 | A | 9/1982 | Ishijima et al. |
| 4,565,716 | A | 1/1986 | Williams, Jr. et al. |
| 5,296,032 | A | 3/1994 | Jenkins et al. |
| 5,637,143 | A | 6/1997 | Jenkins et al. |
| 7,767,018 | B2 | 8/2010 | Nakajima et al. |
| 7,806,976 | B2 | 10/2010 | Nakao |
| 8,088,211 | B2 | 1/2012 | Hashizume et al. |
| 2006/0150864 | A1 | 7/2006 | Hashizume et al. |
| 2010/0058956 | A1 | 3/2010 | Nakajima et al. |
| 2010/0083875 | A1 | 4/2010 | Nakao |
| 2013/0078438 | A1 | 3/2013 | Nakajima et al. |

FOREIGN PATENT DOCUMENTS

| | | |
|---|---|---|
| CN | 1694929 | 11/2005 |
| CN | 10167978 | 3/2010 |
| EP | 2093262 | 8/2009 |
| EP | 2581419 | 4/2013 |
| JP | 55-158202 | 12/1980 |
| JP | 60-15466 | 1/1985 |
| JP | 62-161862 | 7/1987 |
| JP | 8-502317 | 3/1996 |
| JP | 10-130545 | 5/1998 |
| JP | 2003-147226 | 5/2003 |
| JP | 2004-131542 | 4/2004 |
| JP | 3948934 | 4/2007 |
| JP | 2007-169613 | 7/2007 |
| WO | 2004/096921 | 11/2004 |
| WO | 2008/059839 | 5/2008 |

OTHER PUBLICATIONS

China Office action and search report for CN Application No. 201180021263 5, mail date is Sep. 27, 2013.
Search report from E.P.O., mail date is Aug. 2, 2013.
U.S. Appl. No. 13/636,262 to Kazuko Nakajima et al., which was filed on Sep. 20, 2012.
U.S. Appl. No. 13/701,973 to Kazuko Nakajima et al., which was filed on Dec. 4, 2012.
Search report from International Application No. PCT/JP2011/060155, mail date is May 31, 2011.

*Primary Examiner* — Edward Cain
(74) *Attorney, Agent, or Firm* — Greenblum & Bernstein, P.L.C.

(57) ABSTRACT

Provided is a metallic-pigment composition which is usable in coating compositions or ink compositions, in particular, in water-based coating compositions or aqueous inks, and which gives coating compositions having excellent storage stability. The metallic-pigment composition gives a coating film having excellent performances with respect to brightness, hiding properties, flip-flop feeling, etc., causes no colorant or organic-pigment discoloration, and has excellent adhesion and chemical resistance. The metallic-pigment composition comprises one or more mixed-coordination-type heteropolyanion compounds, a hydrolyzate of a silicon compound and/or a condensate thereof, and metal particles.

23 Claims, No Drawings

METALLIC-PIGMENT COMPOSITION

TECHNICAL FIELD

The present invention relates to a metallic pigment composition suitable for coating compositions, ink compositions or the like, in particular, water-based coatings, water-based inks or the like.

BACKGROUND ART

Conventionally, metallic pigments have been used for metallic coatings and printing inks, for kneading into plastic, and the like for the purpose of achieving a decorative effect with a focus on metallic feeling.

Recently, in the field of coatings, in view of resource saving and anti-pollution, there has been an increasing need for conversion to water-based coatings in which the amount of an organic solvent used is small, but there are still few examples of water-based coatings which are practicable in metallic coatings containing a metallic pigment. The reason for this is that metallic pigments are easily corroded in water-based coatings. In the case where metal powders are present in water-based coatings, the metal powders are corroded by water in an acidic, neutral or basic region, or in multiple regions of them depending on the nature of each metal, thereby generating a hydrogen gas. This is an extremely serious safety problem during production processes of coatings and inks in paint manufacturers and ink manufacturers as well as during processes of coatings and prints in automobile manufacturers, home appliance manufacturers and printing companies. The corrosion resistance of metallic pigments in water, water-based coatings or water-based inks is, hereinafter, referred to as "storage stability".

Patent Document 1 discloses an aluminum pigment having an inorganic molybdenum coating film, and also a coating film made of amorphous silica, which covers the inorganic molybdenum coating film.

In addition, Patent Document 2 discloses an aluminum pigment having an inorganic molybdenum coating film and also a coating film made of amorphous silica and/or a coating film formed from a silane coupling agent, which covers the inorganic molybdenum coating film.

However, in any of these patent documents, the deterioration in color tone of the metallic pigment is not avoidable, and the processes therein are also complicated.

In order to simultaneously achieve storage stability in water-based coatings or water-based inks and the maintenance of the color tone of a metallic pigment in them, Patent Document 3 discloses a metallic pigment containing an amine salt of molybdic acid and Patent Document 4 discloses a metallic pigment containing an amine salt of heteropoly acid.

However, in any of these patent documents, storage stability is insufficient. In addition, in any of these patent documents, there is a disadvantage that a dye or an organic pigment in coatings is partially discolored in the case where it is blended with the coatings. Furthermore, in some applications, a coating film obtained by using the metallic pigment is often required to have adhesion and chemical resistance such as acid resistance or alkali resistance.

CITATION LIST

Patent Literature

Patent Document 1: JP 2003-147226 A
Patent Document 2: WO 2004/096921
Patent Document 3: JP 2007-169613 A
Patent Document 4: WO 2008/059839 A

SUMMARY OF INVENTION

Technical Problem

An object of the present invention is to provide a metallic pigment composition that has overcome the above disadvantages of the prior art, namely to provide a metallic pigment composition that can be used in coating compositions, ink compositions or the like, in particular, water-based coatings, water-based inks or the like, that is excellent in storage stability of coatings, that has performances excellent in photoluminescence, hiding power, flip-flop feeling and the like when forming a coating film, and that does not allow a dye or an organic pigment to discolor.

Another object is to provide a metallic pigment composition that is excellent in adhesion and chemical resistance when forming a coating film, in addition to the above performances.

Solution to Problem

The present inventors have found that the above problems can be solved by using a metallic pigment composition containing a mixed-coordination type heteropolyanion compound; a hydrolysate of a silicon-containing compound and/or a condensate thereof; and metallic particles, thereby achieving the present invention.

Namely, the present invention is as follows.
(1) A metallic pigment composition containing one or more mixed-coordination type heteropolyanion compounds, a hydrolysate of a silicon-containing compound and/or a condensate thereof, and metallic particles.
(2) The metallic pigment composition according to (1), further containing an organic oligomer or polymer.
(3) The metallic pigment composition according to (1) or (2), further containing at least one selected from the group consisting of (i) inorganic phosphoric acids or salts thereof, and (ii) acidic organic phosphoric or phosphorous acid esters or salts thereof.
(4) The metallic pigment composition according to any one of (1) to (3), wherein the metallic particles are made of aluminum.
(5) The metallic pigment composition according to any one of (1) to (4), wherein a heteroatom constituting the mixed-coordination type heteropolyanion compound is at least one selected from elements of Group IIIB, Group IVB, and Group VB.
(6) The metallic pigment composition according to (5), wherein the elements of Group IIIB, Group IVB, and Group VB are B, Si, and P.
(7) The metallic pigment composition according to any one of (1) to (6), wherein a polyatom constituting the mixed-coordination type heteropolyanion compound is selected from transition metals.
(8) The metallic pigment composition according to (7), wherein the transition metals are Ti, Zr, V, Nb, Mo, and W.
(9) The metallic pigment composition according to any one of (1) to (4), wherein the mixed-coordination type heteropolyanion compound is at least one selected from $H_3PW_xMo_{12-x}O_{40} \cdot nH_2O$ (phosphotungstomolybdic acid.n-hydrate), $H_{3+x}PV_xMo_{12-x}O_{40} \cdot nH_2O$ (phosphovanadomolybdic acid.n-hydrate), $H_4SiW_xMo_{12-x}O_{40} \cdot nH_2O$ (silicotungstomolybdic acid.n-hydrate), and $H_{4+x}SiV_xMo_{12-x}O_{40} \cdot nH_2O$ (silicovanadomolybdic acid.n-hydrate); and $1 \leq x \leq 11$ and $n \geq 0$.

(10) The metallic pigment composition according to any one of (1) to (8), wherein the mixed-coordination type heteropolyanion compound is a salt of a mixed-coordination type heteropoly acid with at least one selected from the group consisting of alkali metals, alkaline earth metals, and ammonia.

(11) The metallic pigment composition according to (10), wherein the mixed-coordination type heteropoly acid is the mixed-coordination type heteropoly acid according to (9).

(12) The metallic pigment composition according to any one of (1) to (8), wherein the mixed-coordination type heteropolyanion compound is a salt of a mixed-coordination type heteropoly acid with at least one selected from amine compounds represented by the following general formula (1):

[Formula 1]

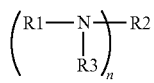

(1)

wherein R1, R2 and R3 may be the same or different, and are each a hydrogen atom, or a mono or divalent hydrocarbon group having 1 to 30 carbon atoms that may optionally contain an ether bond, an ester bond, a hydroxyl group, a carbonyl group, and a thiol group, R1 and R2 are optionally taken together to form a 5-membered or 6-membered cycloalkyl group, or are taken together with a nitrogen atom to form a 5-membered or 6-membered ring that is capable of additionally containing a nitrogen or oxygen atom as a crosslinking member, or R1, R2 and R3 are taken together to form a multi-membered multiring composition that is capable of containing one or more additional nitrogen atoms and/or oxygen atoms as a crosslinking member, and R1, R2 and R3 are not a hydrogen atom at the same time; and n represents a numerical value of 1 to 2.

(13) The metallic pigment composition according to (12), wherein the mixed-coordination type heteropoly acid is a mixed-coordination type heteropoly acid according to (9).

(14) The metallic pigment composition according to any one of (1) to (13), wherein the silicon-containing compound is at least one selected from compounds represented by the following general formula (2), (3), (4) or (5) and a partial condensate thereof:

[Formula 2]

$$R4mSi(OR5)4-m \qquad (2)$$

wherein R4 is a hydrogen atom or a hydrocarbon group having 1 to 30 carbon atoms that may optionally contain a halogen group, R5 is a hydrogen atom or a hydrocarbon group having 1 to 8 carbon atoms, R4 and R5 may be the same or different, and when the numbers of R4 and R5 are each two or more, each of R4 and R5 may be the same, may be partially the same, or may be all different; and $1 \leq m \leq 3$;

[Formula 3]

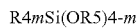

(3)

wherein R6 is a group containing a reactive group that can be chemically bound to other functional group, R7 is a hydrogen atom or a hydrocarbon group having 1 to 30 carbon atoms that may optionally contain a halogen group, R8 is a hydrogen atom or a hydrocarbon group having 1 to 8 carbon atoms, and when the numbers of R6, R7 and R8 are each two or more, each of R6, R7 and R8 may be the same, may be partially the same, or may be all different; and $1 \leq p \leq 3$, $0 \leq q \leq 2$, and $1 \leq p+q \leq 3$;

[Formula 4]

$$Si(OR9)4 \qquad (4)$$

wherein R9 is a hydrogen atom or a hydrocarbon group having 1 to 8 carbon atoms, and when the number of R9 is two or more, each of R9 may be the same, may be partially the same, or may be all different; and

[Formula 5]

(5)

wherein R10 is a hydrogen atom or a hydrocarbon group having 1 to 30 carbon atoms that may optionally contain a halogen group, and when the number of R10 is two or more, each of R10 may be the same, may be partially the same, or may be all different; and $0 \leq r \leq 3$.

(15) The metallic pigment composition according to any one of (2) to (14), wherein the organic oligomer or polymer is an acrylic resin and/or a polyester resin.

(16) The metallic pigment composition according to any one of (3) to (15), wherein the inorganic phosphoric acids are at least one selected from orthophosphoric acid, metaphosphoric acid, pyrophosphoric acid, triphosphoric acid, tetraphosphoric acid, and phosphorous acid.

(17) The metallic pigment composition according to any one of (3) to (15), wherein the inorganic phosphoric acid salts are salts of the inorganic phosphoric acids with at least one selected from alkali metals, alkaline earth metals, ammonia, and amines represented by the following general formula (6):

[Formula 6]

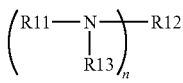

(6)

wherein R11, R12 and R13 may be the same or different, and are each a hydrogen atom, or a mono or divalent hydrocarbon group having 1 to 30 carbon atoms that may optionally contain an ether bond, an ester bond, a hydroxyl group, a carbonyl group, and a thiol group, R11 and R12 are optionally taken together to form a 5-membered or 6-membered cycloalkyl group, R11 and R12 are optionally taken together with a nitrogen atom to form a 5-membered or 6-membered ring that is capable of additionally containing a nitrogen or oxygen atom as a crosslinking member, or R11, R12 and R13 are optionally taken together to form a multi-membered multiring that is capable of containing one or more additional nitrogen atoms and/or oxygen atoms as a crosslinking member, and R11, R12 and R13 are not a hydrogen atom at the same time; and n represents a numerical value of 1 to 2.

(18) The metallic pigment composition according to any one of (3) to (15), wherein the acidic organic phosphoric or phosphorous acid esters are at least one selected from compounds represented by the following general formula (7):

[Formula 7]

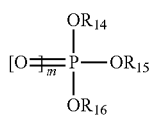

(7)

wherein R14, R15 and R16 may be the same or different, and are each a hydrogen atom, a hydrocarbon group having 1 to 30 carbon atoms that may optionally contain an ether group, an ester group, a hydroxyl group, a carbonyl group, and a halogen group, or a hydrocarbon group that may optionally contain a ring structure or an unsaturated bond, one or two of R14, R15 and R16 are a hydrogen atom, and the total number of carbon atoms of R14, R15 and R16 is 4 or more; and m represents a numerical value of 0 or 1.

(19) The metallic pigment composition according to any one of (3) to (15), wherein the acidic organic phosphoric or phosphorous acid ester salts are salts of phosphoric acid esters represented by the following general formula (7) with at least one selected from alkali metals, alkaline earth metals, ammonia, and amines represented by the following general formula (6):

[Formula 8]

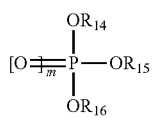

(7)

wherein R14, R15 and R16 may be the same or different, and are each a hydrogen atom, a hydrocarbon group having 1 to 30 carbon atoms that may optionally contain an ether group, an ester group, a hydroxyl group, a carbonyl group, and a halogen group, or a hydrocarbon group that may optionally contain a ring structure or an unsaturated bond, one or two of R14, R15 and R16 are a hydrogen atom, and the total number of carbon atoms of R14, R15 and R16 is 4 or more; and m represents a numerical value of 0 or 1; and

[Formula 9]

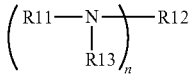

(6)

wherein R11, R12 and R13 may be the same or different, and are each a hydrogen atom, or a mono or divalent hydrocarbon group having 1 to 30 carbon atoms that may optionally contain an ether bond, an ester bond, a hydroxyl group, a carbonyl group, and a thiol group, R11 and R12 are optionally taken together to form a 5-membered or 6-membered cycloalkyl group, R11 and R12 are optionally taken together with a nitrogen atom to form a 5-membered or 6-membered ring that is capable of additionally containing a nitrogen or oxygen atom as a crosslinking member, or R11, R12 and R13 are optionally taken together to form a multi-membered multiring that is capable of containing one or more additional nitrogen atoms and/or oxygen atoms as a crosslinking member, and R11, R12 and R13 are not a hydrogen atom at the same time; and n represents a numerical value of 1 to 2.

(20) The metallic pigment composition according to any one of (2) to (19), wherein a monomer constituting the organic oligomer or polymer is at least one selected from compounds represented by the following general formula (8):

[Formula 10]

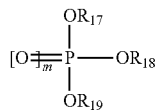

(8)

wherein R17, R18 and R19 may be the same or different, and are each a hydrogen atom, a hydrocarbon group having 1 to 30 carbon atoms that may optionally contain an ether group, an ester group, a hydroxyl group, a carbonyl group, and a halogen group, a hydrocarbon group that may optionally contain a ring structure or an unsaturated bond, or a group represented by the following general formula (9), one or two of R17, R18 and R19 are a hydrogen atom, one or two thereof are the following general formula (9), and the total number of carbon atoms of R17, R18 and R19 is 4 or more; and m represents a numerical value of 0 or 1:

[Formula 11]

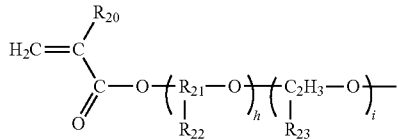

(9)

wherein R20 and R23 represent a hydrogen atom or a methyl group, R21 is a trivalent organic group having 2 to 8 carbon atoms that may optionally contain an oxygen atom, and R22 represents a hydrogen atom or the following general formula (10); and h represents a numerical value of 0 or 1 and i represents a numerical value of 0 to 10:

[Formula 12]

—CH$^2$X (10)

wherein X represents a hydrogen atom or a chlorine atom.

(21) The metallic pigment composition according to any one of (1) to (20), wherein the mixed-coordination type heteropolyanion compound is present in an amount of 0.01 to 10 parts by weight based on 100 parts by weight of the metallic particles.

(22) The metallic pigment composition according to any one of (1) to (21), wherein the hydrolysate of a silicon-containing compound and/or the condensate thereof is present in an amount of 0.01 to 50 parts by weight based on 100 parts by weight of the metallic particles.

(23) The metallic pigment composition according to any one of (2) to (22), wherein the organic oligomer or polymer is present in an amount of 0.01 to 50 parts by weight based on 100 parts by weight of the metallic particles.

(24) The metallic pigment composition according to any one of (3) to (23), containing at least one selected from the group consisting of (i) inorganic phosphoric acids or salts thereof; and (ii) acidic organic phosphoric or phosphorous acid esters or salts thereof in an amount of 0.01 to 20 parts by weight based on 100 parts by weight of the metallic particles.

(25) A method for producing the metallic pigment composition according to any one of (1) to (24), including mixing metallic particles with a mixed-coordination type heteropolyanion compound and a hydrolysate of a silicon-containing compound and/or a condensate thereof in the presence of a solvent in separate steps or in a single step.

(26) The production method according to (25), including mixing the metallic particles with the mixed-coordination type heteropolyanion compound in the presence of a solvent, and then mixing the resulting mixture with the hydrolysate of a silicon-containing compound and/or the condensate thereof.

(27) A method for producing the metallic pigment composition according to any one of (2) to (24), including mixing metallic particles with a mixed-coordination type heteropolyanion compound and a hydrolysate of a silicon-containing compound and/or a condensate thereof in the presence of a solvent in separate steps or in a single step, and then polymerizing or mixing an organic oligomer or polymer.

(28) A coating composition containing the metallic pigment composition according to any one of (1) to (24).

(29) An ink composition containing the metallic pigment composition according to any one of (1) to (24).

(30) A coating film formed by the coating composition according to (28) or being coated with the coating composition according to (28).

(31) A printed material formed by the ink composition according to (29).

In the case where the metallic pigment composition of the present invention is used in coating compositions, ink compositions or the like, in particular water-based coatings, water-based inks or the like, a metallic pigment composition can be obtained that is excellent in storage stability, and excellent in photoluminescence, hiding power, flip-flop feeling and the like when forming a coating film, and that does not allow a dye or an organic pigment to discolor. A metallic pigment composition can also be obtained that is excellent in adhesion and chemical resistance when forming a coating film, in addition to the above performances.

DESCRIPTION OF EMBODIMENTS

Hereinafter, the present invention will be described in detail with reference to, in particular, preferable aspects of the present invention.

As metallic particles for use in the present invention, particles of base metals such as aluminum, zinc, iron, magnesium, copper and nickel, and particles of alloys thereof can be preferably used.

With respect to the shape thereof, the average particle diameter (d50) is 2 to 40 μm, the average thickness (t) is preferably in a range of 0.001 to 10 μm and further preferably in a range of 0.01 to 10 and the average aspect ratio is preferably in a range of 1 to 2500. Herein, the average aspect ratio means a value obtained by dividing the average particle diameter (d50) of the metallic particles by the average thickness (t).

In the case where the metallic particles are used as a pigment, scale-like particles are preferable.

Particularly suitable are aluminum flakes frequently used as a pigment for metallic coatings. As aluminum flakes for use in the present invention, suitable are those having surface texture, particle diameter and shape which are demanded for the pigment for metallic coatings, such as surface glossiness, whiteness and photoluminescence.

Aluminum flakes are usually commercially available in the state of a paste, and may be used as they are or may be used after fatty acid and the like on the surface thereof are removed in advance by an organic solvent and the like. So-called aluminum-deposited foils can also be used in which the average particle diameter (d50) is 3 to 30 μm and the average thickness (t) is 5 to 50 nm.

A mixed-coordination type heteropolyanion of a mixed-coordination type heteropolyanion compound for use in the present invention is one having a structure in which some of polyatoms of a heteropolyanion consisting of one element are substituted with other elements, and exhibiting different physical properties from a mixture of the respective heteropolyanions.

In the case where the mixed-coordination type heteropolyanion is represented by a chemical formula, $[X_pM_qN_rO_s]^t$, the heteropolyanion is represented by $[X_pM_qO_s]^t$, and is also distinguished from an isopolyanion $[M_qO_s]^t$. Herein, a heteroatom, X, represents elements of Group IIIB, Group IVB, and Group VB, such as B, Si, Ge, P, and As, and among them, B, Si, and P are preferable. Polyatoms, M and N, represent transition metals such as Ti, Zr, V, Nb, Mo and W, wherein Ti, Zr, V, Nb, Mo, and W are preferable.

In addition, p, q, r, and s represent the number of atoms and t represents an oxidation number.

Since a heteropolyanion compound has a large number of structures, the mixed-coordination type heteropolyanion compound can have a larger number of structures. Representative and preferable examples of the mixed-coordination type heteropolyanion compound include the following mixed-coordination type heteropoly acids: $H_3PW_xMo_{12-x}O_{40} \cdot nH_2O$ (phosphotungstomolybdic acid.n-hydrate), $H_{3+x}PV_xMo_{12-x}O_{40} \cdot nH_2O$ (phosphovanadomolybdic acid.n-hydrate), $H_4SiW_xMo_{12-x}O_{40} \cdot nH_2O$ (silicotungstomolybdic acid.n-hydrate), and $H_{4+x}SiV_xMo_{12-x}O_{40} \cdot nH_2O$ (silicovanadomolybdic acid.n-hydrate) (wherein, $1 \leq x \leq 11$ and $n \geq 0$).

Among them, preferable specific examples include mixed-coordination type heteropoly acids such as $H_3PW_3Mo_9O_{40} \cdot nH_2O$, $H_3PW_6Mo_6O_{40} \cdot nH_2O$, $H_3PW_9Mo_3O_{40} \cdot nH_2O$, $H_4PV_1Mo_{11}O_{40} \cdot nH_2O$, $H_6PV_3Mo_9O_{40} \cdot nH_2O$, $H_4SiW_3Mo_9O_{40} \cdot nH_2O$, $H_4SiW_6Mo_6O_{40} \cdot nH_2O$, $H_4SiW_9Mo_3O_{40} \cdot nH_2O$, $H_5SiV_1Mo_{11}O_{40} \cdot nH_2O$, and $H_7SiV_3Mo_9O_{40} \cdot nH_2O$ (wherein, $n \geq 0$).

The mixed-coordination type heteropolyanion compound may be used in the form of an acid (so-called, mixed-coordination type heteropoly acid), or may be used in the form of a (partial or complete) salt in which a specified cation serves as a counterion.

Examples of the countercation source in the case of using in the form of a salt include at least one selected from inorganic components such as alkali metals including lithium, sodium, potassium, rubidium, and cesium; alkaline earth metals including magnesium, calcium, strontium, and barium; metals including manganese, iron, cobalt, nickel, copper, zinc, silver, cadmium, lead, and aluminum; and ammonia; and organic components such as amine compounds. Among the inorganic components, salts of alkali metals, alkaline earth metals, and ammonia are preferable.

In the case where at least one selected from these alkali metals, alkaline earth metals, and ammonia serves as the countercation source, the mixed-coordination type heteropolyanion compound is more preferably used in the form of a salt of the countercation source with at least one of $H_3PW_xMo_{12-x}O_{40} \cdot nH_2O$ (phosphotungstomolybdic acid.n-hydrate), $H_{3+x}PV_xMo_{12-x}O_{40} \cdot nH_2O$ (phosphovanadomolybdic acid.n-hydrate), $H_4SiW_xMo_{12-x}O_{40} \cdot nH_2O$ (silicotungstomolybdic acid.n-hydrate), and $H_{4+x}SiV_xMo_{12-x}O_{40} \cdot nH_2O$ (silicovanadomolybdic acid.n-hydrate).

The amine compounds which are the organic components may also be preferably used, and specific examples are those represented by the following general formula (1).

[Formula 13]

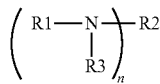

(wherein R1, R2 and R3 may be the same or different, and are each a hydrogen atom, or a mono or divalent hydrocarbon group having 1 to 30 carbon atoms that may optionally contain an ether bond, an ester bond, a hydroxyl group, a carbonyl group, and a thiol group, wherein R1 and R2 are optionally taken together to form a 5-membered or 6-membered cycloalkyl group, R1 and R2 are optionally taken together with a nitrogen atom to form a 5-membered or 6-membered ring that is capable of additionally containing a nitrogen or oxygen atom as a crosslinking member, or R1, R2 and R3 are optionally taken together to form a multi-membered multiring composition that is capable of containing one or more additional nitrogen atoms and/or oxygen atoms as a crosslinking member. R1, R2 and R3 are not a hydrogen atom at the same time. n represents a numerical value of 1 to 2.)

Specific examples include straight primary amines such as ethylamine, propylamine, butylamine, hexylamine, octylamine, laurylamine, tridecylamine and stearylamine; branched primary amines such as isopropylamine, isobutylamine, 2-ethylhexylamine and branched tridecylamine; straight secondary amines such as dimethylamine, diethylamine, dipropylamine, dibutylamine, dihexylamine, dioctylamine, dilaurylamine, ditridecylamine and distearylamine; branched secondary amines such as diisopropylamine, diisobutylamine, di-2-ethylhexylamine and dibranched tridecylamine; asymmetric secondary amines such as N-methylbutylamine, N-ethylbutylamine, N-ethylhexylamine, N-ethyllaurylamine, N-ethylstearylamine, N-isopropyloctylamine and N-isobutyl-2-ethylhexylamine; straight tertiary amines such as trimethylamine, triethylamine, tripropylamine, tributylamine, trioctylamine, trilaurylamine, tritridecylamine and tristearylamine; branched tertiary amines such as triisopropylamine, triisobutylamine, tri-2-ethylhexylamine and tribranched tridecylamine; tertiary amines having a mixed hydrocarbon group, such as N,N-dimethyloctylamine, N,N-dimethyllaurylamine, N,N-dimethylstearylamine and N,N-diethyllaurylamine; and additionally, amines having an alkenyl group, such as allylamine, diallylamine, triallylamine and N,N-dimethylallylamine; and alicyclic primary amines such as cyclohexylamine and 2-methylcyclohexylamine; primary amines having an aromatic ring substituent, such as aniline, benzylamine and 4-methylbenzylamine; alicyclic secondary amines such as N,N-dicyclohexylamine and N,N-di-2-methylcyclohexylamine; secondary amines having an aromatic ring substituent, such as dibenzylamine and N,N-di-4-methylbenzylamine; asymmetric secondary amines such as N-cyclohexyl-2-ethylhexylamine, N-cyclohexylbenzylamine, N-stearylbenzylamine and N-2-ethylhexylbenzylamine; alicyclic tertiary amines such as N,N-dimethylbenzylamine, N,N-dimethylcyclohexylamine and tricyclohexylamine; tertiary amines having an aromatic ring substituent, such as tribenzylamine and tri-4-methylbenzylamine; amines having ether bonds such as morpholine, 3-methoxypropylamine, 3-ethoxypropylamine, 3-butoxypropylamine, 3-decyloxypropylamine, and 3-lauryloxypropylamine; alkanolamines such as monoethanolamine, diethanolamine, monoisopropanolamine, monopropanolamine, butanolamine, triethanolamine, N,N-dimethylethanolamine, N-methylethanolamine, N-methyldiethanolamine, N-ethylethanolamine, N-propylethanolamine, N-isopropylethanolamine, N-butylethanolamine, N-cyclohexyl-N-methylaminoethanol, N-benzyl-N-propylaminoethanol, or N-hydroxyethylpyrrolidine, N-hydroxyethylpiperazine, and N-hydroxyethylmorpholine; diamines such as ethylenediamine, N-methylethylenediamine, N,N'-dimethylethylenediamine, N,N,N',N'-tetramethylethylenediamine, 1,2-propanediamine, 1,3-propanediamine, N,N-dimethyl-1,3-propanediamine, N-cyclohexyl-1,3-propanediamine, N-decyl-1,3-propanediamine, and N-isotridecyl-1,3-propanediamine; cyclic amines such as N,N-dimethylpiperazine, N-methoxyphenylpiperazine, N-methylpiperidine, N-ethylpiperidine, quinuclidine, diazabicyclo[2,2,2]octane, and 1,8-diazabicyclo[5,4,0]-7-undecene; aromatic amines such as pyridine and quinoline; and the like; or mixtures thereof.

Among them, preferable examples include at least one selected from primary, secondary, or tertiary amines of straight or branched alkyl having 4 to 20 carbon atoms, or alkanolamines, and specific examples include butylamine, hexylamine, cyclohexylamine, octylamine, tridecylamine, stearylamine, dihexylamine, di-2-ethylhexylamine, straight or branched ditridecylamine, distearylamine, tributylamine, trioctylamine, straight or branched tritridecylamine, tristearylamine, N,N-dimethylethanolamine, N-methyldiethanolamine, triethanolamine, and morpholine.

The mixed-coordination type heteropolyanion compound is more preferably used in the form of a salt of at least one selected from these amine compounds represented by the general formula (1) with at least one selected from $H_3PW_xMo_{12-x}O_{40} \cdot nH_2O$ (phosphotungstomolybdic acid.n-hydrate), $H_{3+x}PV_xMo_{12-x}O_{40} \cdot nH_2O$ (phosphovanadomolybdic acid.n-hydrate), $H_4SiW_xMo_{12-x}O_{40} \cdot nH_2O$ (silicotungstomolybdic acid.n-hydrate), and $H_{4+x}SiV_xMo_{12-x}O_{40} \cdot nH_2O$ (silicovanadomolybdic acid.n-hydrate).

With respect to the mixed-coordination type heteropolyanion compound, mixed-coordination type heteropoly acids of $H_3PW_xMo_{12-x}O_{40} \cdot nH_2O$ (phosphotungstomolybdic acid.n-hydrate), $H_{3+x}PV_xMo_{12-x}O_{40} \cdot nH_2O$ (phosphovanadomolybdic acid.n-hydrate), and $H_4SiW_xMo_{12-x}O_{40} \cdot nH_2O$ (silicotungstomolybdic acid.n-hydrate), or organic amine salts of these mixed-coordination type heteropoly acids are most preferable.

The mixed-coordination type heteropolyanion compound is preferably added in an amount of 0.01 to 10 parts by weight, and further preferably in an amount of 0.01 to 5 parts by weight, based on 100 parts by weight of the metallic particles.

The mixed-coordination type heteropolyanion compound for use in the present invention may be added at the time of pulverizing or extending a raw material metal powder by a ball mill, may be mixed in a slurry in which a solvent is added to the metallic particles, or may be kneaded in a paste having a reduced amount of a solvent. The mixed-coordination type heteropolyanion compound may also be added to the metallic particles as it is, or may also be diluted by a solvent and added. In order to achieve a uniformly mixed state, the mixed-coordination type heteropolyanion compound is more preferably diluted by a solvent in advance and added. Examples of the solvent used in dilution include water, alcohols such as methanol, ethanol, propanol, butanol, isopropanol, and octanol; ether-alcohols and esters thereof, such as ethylene glycol monoethyl ether, ethylene glycol monobutyl ether, diethylene glycol monoethyl ether, diethylene glycol monobutyl ether, propylene glycol monoethyl ether, propylene glycol monomethyl ether, and dipropylene glycol monomethyl ether; and glycols such as ethylene glycol, propylene glycol, 1,3-butanediol, 1,4-butanediol, polyoxyethylene glycol, polyoxypropylene glycol, and ethylene propylene glycol. The solvent may be dissolved by an acid or alkali, and added.

A silicon-containing compound for use in the present invention is selected from compounds represented by the following general formula (2), (3), (4) or (5):

[Formula 14]

$$R4_mSi(OR5)_{4-m} \quad (2)$$

(wherein R4 is a hydrogen atom or a hydrocarbon group having 1 to 30 carbon atoms that may optionally contain a halogen group, and R5 is a hydrogen atom or a hydrocarbon group having 1 to 8 carbon atoms. R4 and R5 may be the same or different, wherein when the numbers of R4 and R5 are each two or more, each of R4 and R5 may be the same, may be partially the same, or may be all different; and $1 \leq m \leq 3$.)

[Formula 15]

$$R6_pR7_qSi(OR8)_{4-p-q} \quad (3)$$

(wherein R6 is a group containing a reactive group that can be chemically bound to other functional group, R7 is a hydrogen atom or a hydrocarbon group having 1 to 30 carbon atoms that may optionally contain a halogen group, and R8 is a hydrogen atom or a hydrocarbon group having 1 to 8 carbon atoms. When the numbers of R6, R7 and R8 are each two or more, each of R6, R7 and R8 may be the same, may be partially the same, or may be all different; and $1 \leq p \leq 3$, $0 \leq q \leq 2$, and $1 \leq p+q \leq 3$.)

[Formula 16]

$$Si(OR9)_4 \quad (4)$$

(wherein R9 is, each, a hydrogen atom or a hydrocarbon group having 1 to 8 carbon atoms, wherein when the number of R9 is two or more, each of R9 may be the same, may be partially the same, or may be all different.)

[Formula 17]

$$R10_rSiCl_{4-r} \quad (5)$$

(wherein R10 is a hydrogen atom or a hydrocarbon group having 1 to 30 carbon atoms that may optionally contain a halogen group, wherein when the number of R10 is two or more, each of R10 may be the same, may be partially the same, or may be all different; and $0 \leq r \leq 3$.).

The hydrocarbon group in R4 of the formula (2) includes methyl, ethyl, propyl, butyl, hexyl, octyl, decyl, dodecyl, oleyl, stearyl, cyclohexyl, phenyl, benzyl and naphthyl, wherein these may be branched or straight, and may contain a halogen group such as fluorine, chlorine and bromine. Among them, a hydrocarbon group having 1 to 18 carbon atoms is particularly preferable. When the number of R4 is two or more, R4 may be all the same, may be partially the same, or may be all different. The number of R4 in the molecule, in the formula (2), preferably satisfies the following: m=1 to 3, and more preferably m=1 or 2.

The hydrocarbon group in R5 of the formula (2) includes methyl, ethyl, propyl, butyl, hexyl and octyl, wherein these may be branched or straight. Among these hydrocarbon groups, methyl, ethyl, propyl and butyl are particularly preferable. When the number of R5 is two or more, R5 may be all the same, may be partially the same, or may be all different.

The silicon-containing compound in such a formula (2) includes methyltrimethoxysilane, methyltriethoxysilane, methyltributoxysilane, dimethyldimethoxysilane, dimethyldiethoxysilane, dimethyldibutoxysilane, trimethylmethoxysilane, trimethylethoxysilane, n-propyltrimethoxysilane, n-propyltriethoxysilane, n-propyltributoxysilane, butyltrimethoxysilane, butyltriethoxysilane, butyltributoxysilane, dibutyldimethoxysilane, dibutyldiethoxysilane, dibutyldibutoxysilane, isobutyltrimethoxysilane, isobutyltriethoxysilane, hexyltrimethoxysilane, hexyltriethoxysilane, dihexyldimethoxysilane, dihexyldiethoxysilane, octyltrimethoxysilane, octyltriethoxysilane, dioctyldimethoxysilane, dioctyldiethoxysilane, dioctylethoxybutoxysilane, decyltrimethoxysilane, decyltriethoxysilane, didecyldimethoxysilane, didecyldiethoxysilane, octadecyltrimethoxysilane, octadecyltriethoxysilane, dioctadecyldimethoxysilane, dioctadecyldiethoxysilane, phenyltrimethoxysilane, phenyltriethoxysilane, diphenyldimethoxysilane, diphenyldiethoxysilane, trifluoropropyltrimethoxysilane, heptadecafluorodecyltrimethoxysilane, tridecafluorooctyltrimethoxysilane, tridecafluorooctyltriethoxysilane, 3-chloropropyltrimethoxysilane, 3-chloropropyltriethoxysilane, 3-chloropropyltributoxysilane, and the like.

The reactive group that can be chemically bound to other functional group in R6 of the formula (3) includes a vinyl group, an epoxy group, a styryl group, a methacryloxy group, an acryloxy group, an amino group, an ureido group, a mercapto group, a polysulfide group, an isocyanate group, and the like.

When the number of R6 is two or more, R6 may be all the same, may be partially the same, or may be all different. The number of R6 in the molecule, in the formula (3), preferably satisfies the following: p=1 to 3, and more preferably p=1.

The hydrocarbon group in R7 of the formula (3) includes methyl, ethyl, propyl, butyl, hexyl, octyl, decyl, dodecyl, oleyl, stearyl, cyclohexyl, phenyl, benzyl and naphthyl, wherein these may be branched or straight, and may contain a halogen group such as fluorine, chlorine and bromine. Among them, a hydrocarbon group having 1 to 18 carbon atoms is particularly preferable. When the number of R7 is two or more, R7 may be all the same, may be partially the same, or may be all different.

The hydrocarbon group in R8 of the formula (3) includes methyl, ethyl, propyl, butyl, hexyl and octyl, wherein these may be branched or straight. Among these hydrocarbon groups, methyl, ethyl, propyl and butyl are particularly preferable. When the number of R8 is two or more, R8 may be all the same, may be partially the same, or may be all different.

The silicon-containing compound in such a formula (3) includes vinyltrimethoxysilane, vinyltriethoxysilane, vinyltris(2-methoxyethoxy)silane, 2-(3,4-epoxycyclohexyl)ethyltrimethoxysilane, 3-glycidoxypropylmethyldiethoxysilane, 3-glycidoxypropyltrimethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-methyl-3-aminopropyl-trimethoxysilane, N-2-(aminoethyl)-3-aminopropylmethyldimethoxysilane, N-2-(aminoethyl)-3-aminopropylmethyldimethoxysilane, N-2-(aminoethyl)-3-aminopropylmethyldiethoxysilane, 3-aminopropyltrimethoxysilane, 3-aminopropyltriethoxysilane, N-phenyl-3-aminopropyltrimethoxysilane, N-(vinylbenzyl)-2-aminoethyl-3-aminopropyltrimethoxysilane, 3-triethoxysilyl-N-(1,3-dimethyl-butylidene)propylamine, 3-ureidopropyltriethoxysilane, 3-mercaptopropylmethyldimethoxysilane, 3-mercaptopropyltrimethoxysilane, 3-mercaptopropyl-triethoxysilane, bis(triethoxysilylpropyl)tetrasulfide, 3-isocyanatepropyltriethoxysilane, and the like.

The hydrocarbon group in R9 of the formula (4) includes methyl, ethyl, propyl, butyl, hexyl, octyl, and the like, and these may be branched or straight. Among these hydrocarbon groups, methyl, ethyl, propyl and butyl are particularly preferable. Four R9 may be all the same, may be partially the same, or may be all different.

The silicon-containing compound in such a formula (4) includes tetramethoxysilane, tetraethoxysilane, tetraisopropoxysilane, tetrabutoxysilane, and the like. Among them, tetraethoxysilane is particularly preferable.

The hydrocarbon group in R10 of the formula (5) includes methyl, ethyl, propyl, butyl, hexyl, octyl, decyl, dodecyl, oleyl, stearyl, cyclohexyl, phenyl, benzyl, naphthyl, and the like, and these may be branched or straight, and may contain a halogen group such as fluorine, chlorine and bromine. Among them, a hydrocarbon group having 1 to 12 carbon atoms is particularly preferable. When the number of R10 is two or more, R10 may be all the same, may be partially the same, or may be all different. The number of R10 in the molecule, in the formula (5), preferably satisfies the following: r=0 to 3, and more preferably r=1 to 3.

The silicon-containing compound in such a formula (5) includes methyltrichlorosilane, dimethyldichlorosilane, trimethylchlorosilane, octyldimethylchlorosilane, phenyltrichlorosilane, vinyltrichlorosilane, tetrachlorosilane, and the like.

In each of the general formulas (2), (3), (4) and (5) of the present invention, one may be used, or two or more may be used in combination.

A hydrolysate of the silicon-containing compound and/or a condensation reaction product thereof is obtained by stirring and mixing the silicon-containing compound and an amount of water required for performing a hydrolysis reaction together with a hydrolysis catalyst. In that case, a hydrophilic solvent can also be used if necessary. The time for the hydrolysis reaction is adjusted depending on the type of the silicon-containing compound, the temperature at the time of hydrolysis, and the type and concentration of the hydrolysis catalyst.

Examples of the catalyst for the hydrolysis reaction of the silicon-containing compound and/or the condensation reaction thereof, that can be used, include inorganic acids such as hydrochloric acid, nitric acid, sulfuric acid and phosphoric acid; organic acids such as benzoic acid, acetic acid, chloroacetic acid, salicylic acid, oxalic acid, picric acid, phthalic acid and malonic acid; and phosphonic acids such as vinylphosphonic acid, 2-carboxyethanephosphonic acid, 2-aminoethanephosphonic acid and octanephosphonic acid; and the like. These hydrolysis catalysts may be used solely or in combinations of two or more thereof. Examples thereof also include inorganic alkalis such as ammonia, sodium hydroxide and potassium hydroxide; inorganic alkali salts such as ammonium carbonate, ammonium hydrogen carbonate, sodium carbonate and sodium hydrogen carbonate; amines such as monomethylamine, dimethylamine, trimethylamine, monoethylamine, diethylamine, triethylamine, monoethanolamine, diethanolamine, triethanolamine, N,N-dimethylethanolamine, ethylenediamine, pyridine, aniline, choline, tetramethylammonium hydroxide and guanidine; and salts of organic acid, such as ammonium formate, ammonium acetate, monomethylamine formate, dimethylamine acetate, pyridine lactate, guanidinoacetic acid and aniline acetate. These hydrolysis catalysts may be used singly or in combinations of two or more thereof.

As a raw material for the hydrolysis reaction of the silicon-containing compound and/or the condensation reaction thereof, an oligomer which is partially condensed in advance may be used.

The condensation reaction of the hydrolysate of the silicon-containing compound may be performed at the same time with the hydrolysis reaction of the silicon-containing compound, or may be performed in a separate step from the hydrolysis reaction, using a different catalyst if necessary. In that case, heating may be performed if necessary.

The hydrolysis reaction of the silicon-containing compound and/or the condensation reaction may also be performed after or before adding the silicon-containing compound to the metallic particles and the mixed-coordination type heteropolyanion compound. The silicon-containing compound does not need to be completely hydrolyzed.

The hydrolysis reaction of the silicon-containing compound and/or the condensation reaction is preferably performed using a solvent. Examples of the solvent for use in dilution include water; alcohols such as methanol, ethanol, propanol, butanol, isopropanol and octanol; ether-alcohols and esters thereof, such as ethylene glycol monoethyl ether, ethylene glycol monobutyl ether, diethylene glycol monoethyl ether, diethylene glycol monobutyl ether, propylene glycol monoethyl ether, propylene glycol monomethyl ether and dipropylene glycol monomethyl ether; and glycols such as ethylene glycol, propylene glycol, 1,3-butanediol, 1,4-butanediol, polyoxyethylene glycol, polyoxypropylene glycol and ethylenepropylene glycol. When alcohols or ether alcohols are used for the solvent, an exchange reaction of an alkoxy group in the silicon-containing compound with the solvent may occur, but such alcohols may be used for the hydrolysis reaction as they are.

The hydrolysate of the silicon-containing compound and/or the condensate thereof is preferably added in an amount of 0.01 to 50 parts by weight, and more preferably 1 to 30 parts by weight, based on 100 parts by weight of the metallic particles.

The hydrolysate of the silicon-containing compound and/or the condensate thereof, used in the present invention, may be added at the time of pulverizing or extending a raw material metal powder by a ball mill, may be mixed in a slurry in which the solvent is added to the metallic particles, or may be kneaded in a paste having a reduced amount of the solvent.

A predetermined amount to be added may be initially added at once, or may be continuously added over a predetermined time. They may be added before the mixed-coordination type heteropolyanion compound is added to the metal particles, or may be added after being previously mixed with the mixed-coordination type heteropolyanion compound, but are preferably added after the mixed-coordination type heteropolyanion compound is added.

The present invention can further contain an organic oligomer or polymer in order to achieve a metallic pigment composition that is excellent in adhesion and chemical resistance when forming a coating film. The present invention can also further contain at least one selected from the group consisting of (i) inorganic phosphoric acids or salts thereof; and (ii) acidic organic phosphoric or phosphorous acid esters or salts thereof; in order to have excellent in storage stability when forming a coating film.

As the organic oligomer or polymer included in the present invention, an acrylic resin and/or a polyester resin is preferably used. The organic oligomer or polymer contained in the present invention preferably has interaction with at least one of the metallic particles, the mixed-coordination type heteropolyanion compound, and the hydrolysate of the silicon-containing compound and/or the condensate thereof, which coexist. Therefore, the acrylic resin is preferably a polymer made of monomers which can interact with at least one of the metallic particles, the mixed-coordination type heteropolyanion compound, and the hydrolysate of the silicon-containing compound and/or the condensate thereof, which coexist, and at least one of monomers which can have a crosslinked structure, and in that case, any other monomers may be optionally used in combination.

The monomers which can interact with at least one of the metallic particles, the mixed-coordination type heteropolyanion compound, and the hydrolysate of the silicon-containing compound and/or the condensate thereof, which coexist, are preferably at least one selected from the group consisting of, for example, radical and/or ionic polymerizable unsaturated carboxylic acid; phosphoric acid or phosphonic acid ester having a radical and/or ionic polymerizable double bond; a compound having a radical and/or ionic polymerizable double bond and an isocyanate group; a compound having a radical and/or ionic polymerizable double bond and an epoxy group; a compound having a radical and/or ionic polymerizable double bond and an amino group; a compound having a radical and/or ionic polymerizable double bond and a hydrolyzable silyl group; a compound having a radical and/or ionic polymerizable double bond and a sulfone group; a compound having a radical and/or ionic polymerizable double bond and a hydroxyl group; and the like.

Examples of the radical and/or ionic polymerizable unsaturated carboxylic acid include acrylic acid, methacrylic acid, itaconic acid, crotonic acid, citraconic acid, fumaric acid, maleic acid, maleic anhydride, monomethyl maleate, monoethyl maleate, monooctyl maleate, monomethyl fumarate, monoethyl fumarate, monooctyl fumarate, β-carboxyethyl (meth)acrylate, 2-(meth)acryloyloxyethylhexahydrophthalic acid, 2-(meth)acryloyloxypropylhexahydrophthalic acid, 2-methacroyloxyethylsuccinic acid, 2-methacroyloxyethylmaleic acid, 2-(meth)acryloyloxyethylphthalic acid, 2-(meth)acryloyloxypropylphthalic acid, myristoleic acid, oleic acid, eicosadienoic acid, docosadienoic acid, and the like.

Among them, acrylic acid, methacrylic acid, itaconic acid, fumaric acid, maleic acid, maleic anhydride, and the like are preferably used.

As the phosphoric acid or phosphonic acid ester having a radical and/or ionic polymerizable double bond, a mono or diester of phosphoric acid or phosphonic acid is used. Among them, a mono or diester of phosphoric acid is preferably used, and such a compound is represented by the following general formula (8):

[Formula 18]

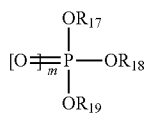

(8)

(wherein R17, R18 and R19 may be the same or different, and are each a hydrogen atom, a hydrocarbon group having 1 to 30 carbon atoms that may optionally contain an ether group, an ester group, a hydroxyl group, a carbonyl group, and a halogen group, a hydrocarbon group that may optionally contain a ring structure or an unsaturated bond, or a group represented by the following general formula (9), wherein one or two of R17, R18 and R19 are a hydrogen atom, one or two thereof are the following general formula (9), and the total number of carbon atoms of R17, R18 and R19 is 4 or more. m represents a numerical value of 0 or 1.)

[Formula 19]

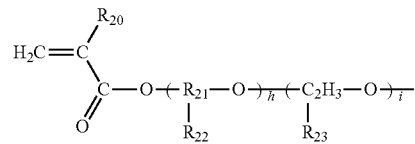

(9)

(wherein R20 and R23 represent a hydrogen atom or a methyl group, R21 is a trivalent organic group having 2 to 8 carbon atoms that may optionally contain an oxygen atom, R22 represents a hydrogen atom or the following general formula (10). h represents a numerical value of 0 or 1 and i represents a numerical value of 0 to 10.)

[Formula 20]

$$-CH^2X \qquad (10)$$

(wherein X represents a hydrogen atom or a chlorine atom.).

Specific examples thereof include 2-(meth)acryloyloxyethyl acid phosphate, di-2-(meth)acryloyloxyethyl acid phosphate, tri-2-(meth)acryloyloxyethyl phosphate and any mixtures thereof; 2-(meth)acryloyloxypropyl acid phosphate, di-2-(meth)acryloyloxypropyl acid phosphate, tri-2-(meth) acryloyloxypropyl phosphate and any mixtures thereof; phenyl-2-(meth)acryloyloxyethyl acid phosphate, butyl-2-(meth)acryloyloxyethyl acid phosphate, octyl-2-(meth) acryloyloxyethyl acid phosphate, bis(2-chloroethyl)vinyl phosphonate, 3-chloro-2-acid phosphoxypropyl(meth)acrylate, acid phosphoxy-polyoxyethylene glycol mono(meth) acrylate and acid phosphoxy-polyoxypropylene glycol mono (meth)acrylate. These can also be optionally used in the form of a salt with an inorganic base or an organic amine. The organic amine used herein is represented by the following general formula (6):

[Formula 21]

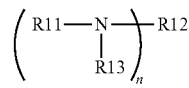

(6)

(wherein R11, R12 and R13 may be the same or different, are each a hydrogen atom, or a mono or divalent hydrocarbon group having 1 to 30 carbon atoms that may optionally contain an ether bond, an ester bond, a hydroxyl group, a carbonyl group, and a thiol group, R11 and R12 are optionally taken together to form a 5-membered or 6-membered cycloalkyl group, R11 and R12 are optionally taken together with a nitrogen atom to form a 5-membered or 6-membered ring that is capable of additionally containing a nitrogen or oxygen atom as a crosslinking member, or R11, R12 and R13 are optionally taken together to form a multi-membered multiring that is capable of containing one or more additional nitrogen atoms and/or oxygen atoms as a crosslinking members. R11, R12 and R13 are not a hydrogen atom at the same time. n represents a numerical value of 1 to 2.).

Among them, 2-(meth)acryloyloxyethyl acid phosphate, di-2-(meth)acryloyloxyethyl acid phosphate, tri-2-(meth)

acryloyloxyethyl phosphate and any mixtures thereof; 2-(meth)acryloyloxypropyl acid phosphate, di-2-(meth)acryloyloxypropyl acid phosphate, tri-2-(meth)acryloyloxypropyl phosphate and any mixtures thereof; and organic amine salts thereof, and the like, in particular, salts such as ethanolamine salts and morpholine salts are preferably used.

Examples of the compound having a radical and/or ionic polymerizable double bond and an isocyanate group include 2-isocyanatoethyl(meth)acrylate, 2-isocyanatoethoxyethyl (meth)acrylate, 1,1-bis(acryloyloxymethyl)ethyl isocyanate, methacryloyloxyphenyl isocyanate, and the like, and these are preferably used.

Examples of the compound having a radical and/or ionic polymerizable double bond and an epoxy group include glycidyl(meth)acrylate, methylglycidyl(meth)acrylate, 3,4-epoxycyclohexylmethyl(meth)acrylate, epoxylated polybutadiene, and the like, and these are preferably used.

Examples of the compound having a radical and/or ionic polymerizable double bond and an amino group include aminoethyl(meth)acrylate, dimethylaminoethyl(meth)acrylate, diethylaminoethyl(meth)acrylate, morpholinoethyl(meth) acrylate, N,N-dimethylaminoethyl(meth)acrylamide, 2-aminoethyl vinyl ether, 2-dimethylaminoethyl vinyl ether, N,N-dimethylaminopropyl(meth)acrylamide, amino styrene, N,N-dimethylaminostyrene, vinylbenzylamine, allylamine, and the like.

Among them, aminoethyl(meth)acrylate, dimethylaminoethyl(meth)acrylate, diethylaminoethyl(meth)acrylate, allylamine, and the like are preferably used.

Examples of the compound having a radical and/or ionic polymerizable double bond and a hydrolyzable silyl group include (meth)acryloyloxypropyltrimethoxysilane, (meth) acryloyloxypropyltriethoxysilane, (meth)acryloyloxypropylmethyldimethoxysilane, (meth)acryloyloxypropylmethyldiethoxysilane, (meth)acryloyloxyethoxypropyltrimethoxysilane, (meth)acryloyloxymethyldimethylsilanol, vinyltrimethoxysilane, vinyltriethoxysilane, and the like.

Among them, (meth)acryloyloxypropyltrimethoxysilane, (meth)acryloyloxypropyltriethoxysilane, and the like are preferably used.

Examples of the compound having a radical and/or ionic polymerizable double bond and a sulfone group include p-styrenesulfonic acid, allylsulfosuccinic acid, 3-sulfopropyl (meth)acrylate, and the like, and these are preferably used.

Examples of the compound having a radical and/or ionic polymerizable double bond and a hydroxyl group include (meth)acrylic acid esters having activated hydrogen, such as 2-hydroxyethyl(meth)acrylate, 2-hydroxypropyl(meth)acrylate, 2-hydroxybutyl(meth)acrylate, 3-hydroxypropyl(meth) acrylate, 4-hydroxybutyl(meth)acrylate, 2-hydroxy-3-chloropropyl(meth)acrylate, 2-hydroxy-3-phenoxypropyl(meth) acrylate, (4-hydroxymethylcyclohexyl)(meth)acrylate, 2-(meth)acryloyloxyethyl-2-hydroxyethylphthalate, polyethylene glycol mono(meth)acrylate, polypropylene glycol mono(meth)acrylate, caprolactone modified hydroxyethyl (meth)acrylate, glycerol mono(meth)acrylate and trimethylolpropane mono(meth)acrylate; hydroxyalkyl vinyl ethers such as 2-hydroxyethyl vinyl ether, 4-hydroxybutyl vinyl ether and hydroxycyclohexyl vinyl ether; unsaturated alcohols such as butene-1-ol-3,2-methylbutene-3-ol-2,3-methylbutene-3-ol-1 and 3-methylbutene-2-ol-1; N-methylol(meth) acrylamide; and the like.

Among them, 2-hydroxyethyl(meth)acrylate, 2-hydroxypropyl(meth)acrylate, and the like are preferably used.

These monomers which can interact with at least one of the metallic particles, the mixed-coordination type heteropolyanion compound, the hydrolysate of the silicon-containing compound and/or the condensate thereof, which co-exist, may be used solely, or two or more thereof may be mixed for use.

With respect to the amount used, the monomers are generally preferably added in an amount of 0.01 to 30 parts by weight, and further preferably 0.1 to 20 parts by weight, based on 100 parts by weight of the metallic particles.

As the monomers which can have a crosslinked structure, a monomer having at least two radical and/or ionic polymerizable double bonds in one molecule is preferable.

Examples of a monomer having two radical and/or ionic polymerizable double bonds in one molecule include ethyleneglycol di(meth)acrylate, 1,4-butanediol di(meth)acrylate, 1,6-hexanediol di(meth)acrylate, 1,9-nonanediol di(meth) acrylate, 1,6-hexanediol diglycidylether di(meth)acrylate, neopentyl glycol di(meth)acrylate, glycerin di(meth)acrylate, di(meth)acrylate of neopentyl glycol propyleneoxide adduct, diethylene glycol di(meth)acrylate, triethylene glycol di(meth)acrylate, polyethylene glycol di(meth)acrylate, dipropylene glycol di(meth)acrylate, tripropylene glycol di(meth)acrylate, polypropylene glycol di(meth)acrylate, polytetramethylene glycol di(meth)acrylate, hydroxypivalic acid neopentyl glycol ester di(meth)acrylate, di(meth)acrylate of bisphenol A ethyleneoxide adduct, di(meth)acrylate of hydrogenated bisphenol A propyleneoxide adduct, dimethylol tricyclodecane di(meth)acrylate, glycerin methacrylate acrylate, divinylbenzene, vinyl adipate, vinyl(meth)acrylate, vinyl crotonate, vinyl cinnamate, allyl vinyl ether, isopropenyl vinyl ether, and the like.

Examples of a monomer having three or more radical and/or ionic polymerizable double bonds in one molecule include trimethylolpropane tri(meth)acrylate, tri(meth)acrylate of glycerin ethylene oxide adduct, tri(meth)acrylate of trimethylolpropane propylene oxide adduct, ditrimethylolpropane tetra(meth)acrylate, pentaerythritol tetra(meth)acrylate, dipentaerythritol penta(meth)acrylate, dipentaerythritol hexa (meth)acrylate, hexa(meth)acrylate of dipentaerythritol caprolactone adduct, dipentaerythritol tri(meth)acrylate tripropionate, dipentaerythritol hexa(meth)acrylate monopropionate, and the like. These monomers which can have a crosslinked structure may be used solely, or two ore more thereof may be mixed for use.

With respect to the amount used, the monomers are generally preferably added in an amount of 0.01 to 50 parts by weight, and further preferably 1 to 30 parts by weight, based on 100 parts by weight of the metallic particles.

In addition to the monomers which can interact with at least one of the metallic particles, the mixed-coordination type heteropolyanion compound, and the hydrolysate of the silicon-containing compound and/or the condensate thereof, which coexist, and the monomers which can have a crosslinked structure, other monomers can also be copolymerized.

Examples of other monomers which can also be copolymerized include (meth)acrylic acid esters such as methyl (meth)acrylate, ethyl(meth)acrylate, isopropyl(meth)acrylate, n-butyl(meth)acrylate, hexyl(meth)acrylate, cyclohexyl (meth)acrylate, 2-ethylhexyl(meth)acrylate, lauryl(meth) acrylate, benzyl(meth)acrylate, isobornyl(meth)acrylate, dicyclopentenyl(meth)acrylate and furfuryl(meth)acrylate; (meth)acrylic acid esters having a fluorine-containing side chain such as trifluoroethyl(meth)acrylate, 2,2,3,3-tetrafluoropropyl(meth)acrylate and perfluorooctylethyl(meth)acrylate; unsaturated amides such as (meth)acrylamide, N,N-dimethyl(meth)acrylamide, N-isopropyl(meth)acrylamide, (meth)acryloyl morpholine and diacetone (meth)acrylamide;

vinyl esters such as vinyl acetate, vinyl propionate, vinyl pivalate, vinyl caprate, vinyl stearate and vinyl benzoate; vinyl ethers such as methyl vinyl ether, ethyl vinyl ether, butyl vinyl ether, cyclohexyl vinyl ether, 2-ethylhexyl vinyl ether and lauryl vinyl ether; fluorinated olefins such as tetrafluoroethylene, chlorotrifluoroethylene, hexafluoropropylene and perfluoropentene-1; styrene, α-methylstyrene, vinyltoluene, (meth)acrylonitrile, dibutyl fumarate, and the like.

Furthermore, monomers having a condensed polycyclic hydrocarbon skeleton, such as pentalene, indene, naphthalene, azulene, heptalene, biphenylene, indacene, fluorene, 9,9-bisphenylfluorene, phenanthrene, anthracene, triphenylene, pyrene and perylene, and monomers having a condensed heterocyclic skeleton, such as indole, quinoline, indolizine, carbazole, acridine and phenoxazine can also be used. Specific examples thereof include vinylnaphthalene, divinylnaphthalene, vinylanthracene, divinylanthracene, N-vinylcarbazole, N-acryloylcarbazole, divinylfluorene, 9,9-bis[4-((meth)acryloyloxyethoxy)phenyl]fluorene and 9,9-bis[4-((meth)acryloyloxy-2(or 1)methylethoxy)phenyl]fluorene.

All the above monomers may be used solely, or two or more thereof may be mixed for use.

The amount used is, for example, generally in the order of 0 to 30 parts by weight based on 100 parts by weight of the metallic particles.

These (meth)acrylic monomers are polymerized by any known method such as radical polymerization and ionic polymerization, and usually simply polymerized by a radical polymerization method using a polymerization initiator.

Examples of the radical polymerization initiator include peroxides such as benzoyl peroxide, lauroyl peroxide and bis-(4-t-butylcyclohexyl)peroxydicarbonate; azo compounds such as 2,2'-azobis-isobutyronitrile and 2,2'-azobis-2,4-dimethylvaleronitrile; and the like.

The amount used is not particularly limited, and usually in the order of 0.1 to 20 parts by weight based on 100 parts by weight of a monomer having a radical polymerizable double bond.

Polymerization is performed in a slurry, in which the solvent is added to the metallic particles, by adding the monomer and the polymerization initiator simultaneously or separately at once, simultaneously or separately in portions, or simultaneously or separately in series.

In particular, a method of adding the monomer and the polymerization initiator separately in portions or in series is preferably used.

The monomer and the polymerization initiator may be added at the same time as adding the mixed-coordination type heteropolyanion compound and the hydrolysate of the silicon-containing compound and/or the condensate thereof to the metallic particles, but may be preferably added in a different kind of solvent if necessary, after adding the mixed-coordination type heteropolyanion compound and the hydrolysate of the silicon-containing compound and/or the condensate thereof, thereby performing polymerization.

The solvent at the time of adding and polymerization reaction may be a hydrophobic solvent or a hydrophilic solvent. Examples of the hydrophobic solvent include mineral spirit, solvent naphtha, LAWS (Low Aromatic White Spirit), HAWS (High Aromatic White Spirit), toluene, xylene, esters such as ethyl acetate and butyl acetate, and ketones such as methyl ethyl ketone, methyl isobutyl ketone and cyclohexanone. Examples of the hydrophilic solvent that can be used include alcohols such as methanol, ethanol, propanol, butanol, isopropanol and octanol, ether alcohols and esters thereof, such as ethylene glycol monoethyl ether, ethylene glycol monobutyl ether, diethylene glycol monoethyl ether, diethylene glycol monobutyl ether, propylene glycol monoethyl ether, propylene glycol monomethyl ether and dipropylene glycol monomethyl ether, glycols such as propylene glycol, polyoxyethylene glycol, polyoxypropylene glycol and ethylene propylene glycol, and the like. These can be used solely or used as a mixture thereof.

Solvents having a relatively low polarity, for example, mineral spirit, solvent naphtha, LAWS, HAWS, toluene, xylene, butyl acetate, methyl isobutyl ketone, cyclohexanone, octanol, ether alcohols and esters thereof, such as ethylene glycol monoethyl ether, ethylene glycol monobutyl ether, diethylene glycol monoethyl ether, diethylene glycol monobutyl ether, propylene glycol monoethyl ether, propylene glycol monomethyl ether and dipropylene glycol monomethyl ether, and the like are more preferably exemplified.

The polymerization reaction in the slurry is performed with the concentration of the metallic particles in the slurry being preferably 5 to 20% by weight. The polymerization temperature and time are appropriately determined depending on the progression of the reaction, and usually the temperature is about 0° C. to 150° C. and the time is about 0.5 to 48 hours.

Examples of the polyester resins include polyester resins obtained by a condensation reaction of one or a mixture selected from the group of carboxylic acids such as succinic acid, adipic acid, sebacic acid, dimer acid, maleic anhydride, phthalic anhydride, isophthalic acid, terephthalic acid, trimellitic acid and pyromellitic acid, with one or a mixture of polyhydric alcohols selected from the group of the following: diols such as ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 2,5-hexanediol, 2-methyl-2,4-pentanediol, 2-ethyl-hexanediol, 1,2-octanediol, 1,2-decanediol, 2,2,4-trimethylpentanediol, 2-butyl-2-ethyl-1,3-propanediol and 2,2-diethyl-1,3-propanediol; triols such as glycerin and trimethylolpropane; and tetraols such as diglycerin, dimethylolpropane and pentaerythritol.

With respect to the amount used, the polyester resin is generally and preferably added in an amount of 0.01 to 50 parts by weight, and further preferably 1 to 30 parts by weight based on 100 parts by weight of the metallic particles.

The organic oligomer or polymer for use in the present invention may be obtained by starting polycondensation at the same time as or after adding the mixed-coordination type heteropolyanion compound and the hydrolysate of the silicon-containing compound and/or the condensate thereof to the metallic particles, or may be added in advance in the state of oligomer or polymer, but is preferably obtained by performing polycondensation.

Examples of the inorganic phosphoric acids for use in the present invention include orthophosphoric acid, pyrophosphoric acid, metaphosphoric acid, triphosphoric acid, tetraphosphoric acid, phosphorous acid, polyphosphoric acid, laurylphosphoric acid, polyoxypropylene oleylether phosphoric acid and dipolyoxyethylene nonylphenylether phosphoric acid. Among them, orthophosphoric acid, pyrophosphoric acid, metaphosphoric acid, triphosphoric acid, tetraphosphoric acid and phosphorous acid are particularly preferable.

The acidic organic phosphoric acid esters or acidic organic phosphorous acid esters (in the present application, referred to also as "acidic organic phosphoric or phosphorous acid esters") for use in the present invention are represented by the following general formula (7) or (8):

[Formula 22]

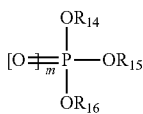
(7)

(wherein R14, R15 and R16 may be the same or different, and are each a hydrogen atom, a hydrocarbon group having 1 to 30 carbon atoms that may optionally contain an ether group, an ester group, a hydroxyl group, a carbonyl group, and a halogen group, or a hydrocarbon group that may optionally contain a ring structure or an unsaturated bond, wherein one or two of R14, R15 and R16 are a hydrogen atom and the total number of carbon atoms of R14, R15 and R16 is 4 or more. m represents a numerical value of 0 or 1.)

[Formula 23]

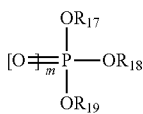
(8)

(wherein R17, R18 and R19 may be the same or different, and are each a hydrogen atom, a hydrocarbon group having 1 to 30 carbon atoms that may optionally contain an ether group, an ester group, a hydroxyl group, a carbonyl group, and a halogen group, a hydrocarbon group that may optionally contain a ring structure or an unsaturated bond, or a group represented by the following general formula (9), wherein one or two of R17, R18 and R19 are a hydrogen atom, one or two thereof are the following general formula (9), and the total number of carbon atoms of R17, R18 and R19 is 4 or more. m represents a numerical value of 0 or 1.)

[Formula 24]

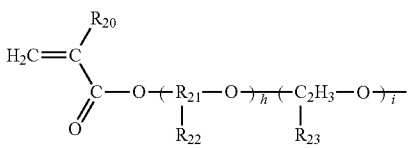
(9)

(wherein R20 and R23 represent a hydrogen atom or a methyl group, R21 is a trivalent organic group having 2 to 8 carbon atoms that may optionally contain an oxygen atom, and R22 represents a hydrogen atom or the following general formula (10). h represents a numerical value of 0 or 1 and i represents a numerical value of 0 to 10.)

[Formula 25]

—CH$^2$X  (10)

(wherein X represents a hydrogen atom or a chlorine atom.).

Examples of the general formula (7) include respective monoesters and diesters, such as methyl acid phosphate, ethyl acid phosphate, butyl acid phosphate, octyl acid phosphate, lauryl acid phosphate, tridecyl acid phosphate, stearyl acid phosphate, oleyl acid phosphate, tetracosyl acid phosphate, nonylphenyl acid phosphate, phenyl acid phosphate, polyoxyethylene alkyl ether acid phosphate, polyoxyethylene alkyl phenyl ether acid phosphate, acid phosphooxyethyl methacrylate, acid phosphooxypolyoxyethylene glycol monomethacrylate, acid phosphooxypolyoxypropylene glycol monomethacrylate, 3-chloro-2-acid phosphooxypropyl methacrylate, diethyl hydrogen phosphite, dilauryl hydrogen phosphite, dioleyl hydrogen phosphite and diphenyl hydrogen phosphite, and mixtures thereof. These acidic organic phosphoric or phosphorous acid esters may also partially include triesters of an unsubstituted inorganic phosphoric acid and/or triesters not exhibiting acidity. Among them, particularly preferable examples include monoesters and diesters, such as octyl acid phosphate, lauryl acid phosphate, tridecyl acid phosphate, stearyl acid phosphate, acid phosphooxypolyoxypropylene glycol monomethacrylate and dilauryl hydrogen phosphites, and mixtures thereof.

Examples of the general formula (8) include 2-(meth)acryloyloxyethyl acid phosphate, di-2-(meth)acryloyloxyethyl acid phosphate and tri-2-(meth)acryloyloxyethyl phosphate, and any mixtures thereof; 2-(meth)acryloyloxypropyl acid phosphate, di-2-(meth)acryloyloxypropyl acid phosphate and tri-2-(meth)acryloyloxypropyl phosphate, and any mixtures thereof; phenyl-2-(meth)acryloyloxyethyl acid phosphate, butyl-2-(meth)acryloyloxyethyl acid phosphate, octyl-2-(meth)acryloyloxyethyl acid phosphate, bis(2-chloroethyl) vinyl phosphonate, 3-chloro-2-acid phosphooxypropyl (meth)acrylate, acid phosphooxy-polyoxyethylene glycol mono(meth)acrylate and, acid phosphooxy-polyoxypropylene glycol mono(meth)acrylate, and the like.

Substances constituting the inorganic phosphoric acid salts or acidic organic phosphoric or phosphorous acid ester salts for use in the present invention include alkali metals such as potassium and sodium, alkaline earth metals such as calcium and magnesium, ammonia, and amines represented by the following general formula (6):

[Formula 26]

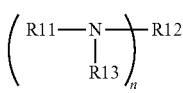
(6)

(wherein R11, R12 and R13 may be the same or different, are each a hydrogen atom, or a mono or divalent hydrocarbon group having 1 to 30 carbon atoms that may optionally contain an ether bond, an ester bond, a hydroxyl group, a carbonyl group, and a thiol group, wherein R11 and R12 are optionally taken together to form a 5-membered or 6-membered cycloalkyl group, R11 and R12 are optionally taken together with a nitrogen atom to form a 5-membered or 6-membered ring that is capable of additionally containing a nitrogen or oxygen atom as a crosslinking member, or R11, R12 and R13 are optionally taken together to form a multi-membered multi-ring that is capable of containing one or more additional nitrogen atoms and/or oxygen atoms as a crosslinking member. R11, R12 and R13 are not a hydrogen atom at the same time. n represents a numerical value of 1 to 2.).

Particularly preferable examples among these amines include diethylamine, triethylamine, propylamine, dipropylamine, tripropylamine, octylamine, dioctylamine and trioctylamine, and additionally primary, secondary and tertiary amines having a straight or branched alkyl group having in the order of 10 to 20 carbon atoms, morpholine, N-methylmorpholine, ethanolamine, diethanolamine, N-methylethanolamine, N-methyldiethanolamine, N,N-dimethylethanolamine and triethanolamine.

(i) The inorganic phosphoric acids or salts thereof or (ii) acidic organic phosphoric or phosphorous acid esters or salts thereof for use in the present invention may be added when the raw material metal powder is pulverized by a ball mill, may be mixed in a slurry in which the solvent is added to the metallic pigment, or may be kneaded in a paste having a reduced amount of the solvent. In order to achieve a uniformly mixed state, they are preferably diluted with a solvent, mineral oil or the like in advance and added. Examples of the solvent for use in dilution include alcohols such as methanol and isopropanol, cellosolves such as propylene glycol monomethyl ether, hydrocarbon solvents such as hexane, octane, isooctane, benzene, toluene, xylene, tetralin and decalin, industrial gasolines such as mineral spirit and solvent naphtha, esters such as ethyl acetate and butyl acetate, ketones such as methyl ethyl ketone, methyl isobutyl ketone and cyclohexanone, mineral oils, and the like.

In the production of the metallic pigment composition of the present invention, the order of the mixing of the mixed-coordination type heteropolyanion compound, the hydrolysate of the silicon-containing compound and/or the condensate thereof, and further at least one selected from the group consisting of the organic oligomer or polymer, the inorganic phosphoric acids or salts thereof, and the acidic organic phosphoric or phosphorous acid esters or salts thereof, with the metallic particles; the polymerization of the organic oligomer or polymer; or the hydrolysis and condensation reaction treatment of the silicon-containing compound may be freely determined. However, it is preferable to perform these operations in the presence of the solvent selected from the examples described in items each describing each compound, and further, it is preferable to first perform the mixing treatment or the hydrolysis and condensation reaction treatment of the mixed-coordination type heteropolyanion compound and the hydrolysate of the silicon-containing compound and/or the condensate thereof in separate steps or in a single step. In that case, it is more preferable to perform, after the mixing treatment with the mixed-coordination type heteropolyanion compound, the mixing treatment or the hydrolysis and condensation reaction treatment with the hydrolysate of the silicon-containing compound and/or the condensate thereof.

Furthermore, it is preferable to perform, after treating the mixed-coordination type heteropolyanion compound and the hydrolysate of the silicon-containing compound and/or the condensate thereof in separate steps or in a single step, the mixing or polymerization treatment of at least one selected from the organic oligomer or polymer; the inorganic phosphoric acids or salts thereof; and the acidic organic phosphoric or phosphorous acid esters or salts thereof. When the organic oligomer or polymer and the inorganic phosphoric acids or salts thereof or acidic organic phosphoric or phosphorous acid esters or salts thereof are used together, they may be subjected to the mixing (polymerization) treatment in separate steps or in a single step, but, more preferably, the organic oligomer or polymer are subjected to the mixing or polymerization treatment and thereafter the inorganic phosphoric acids or salts thereof or the acidic organic phosphoric or phosphorous acid esters or salts thereof are subjected to the mixing treatment.

To the metallic pigment composition of the invention of the present application may be further added at least one selected from an antioxidant, a light stabilizer, a polymerization inhibitor and a surfactant, in addition to the mixed-coordination type heteropolyanion compound, the hydrolysate of the silicon-containing compound and/or the condensate thereof, the organic oligomer or polymer, and/or the inorganic or organic phosphoric acid compound.

The antioxidant is typified by a phenol compound, a phosphorus compound and a sulfur compound. As a suitable compound, exemplified are phenol compounds such as 2,6-di-t-butylphenol, 2,4-dimethyl-6-t-butylphenol, 2,6-di-t-butyl-p-cresol (BHT), 2,6-di-t-butyl-4-ethyl-phenol, 2,4,6-tri-t-butylphenol, butylhydroxyanisole (BHA), 2,2'-methylene bis (4-methyl-6-t-butylphenol), 4,4'-thiobis(3-methyl-6-t-butylphenol), octadecyl-3-(3,5-di-t-butylphenyl)propionate (IRGANOX 1076), hexamethylene bis[3-(3,5-di-t-butyl-4-hydroxyphenyl)propionate] (IRGANOX 259), thiodiethylene bis[3-(3,5-di-t-butyl-4-hydroxyphenyl)propionate] (IRGANOX 1035), tris(3,5-di-t-butyl-4-hydroxybenzyl) isocyanurate (IRGANOX 3114), tetrakis[methylene-3-(3',5'-di-t-butyl-4-hydroxyphenyl)propionate]methane (IRGANOX 1010), calcium diethylbis[[[3,5-bis(1,1-dimethylethyl)-4-hydroxyphenyl]methyl]phosphonate] (IRGANOX 1425 WL), ethylenebis(oxyethylene)bis[3-(5-t-butyl-4-hydroxy-m-tolyl)propionate] (IRGANOX 245), benzene propanoic acid, 3,5-bis(1,1-dimethylethyl)-4-hydroxyalkylester (IRGANOX 1135), N,N'-hexane-1,6-diyl bis[3-(3,5-di-t-butyl-4-hydroxyphenyl)propionamide] (IRGANOX 1098) and tocopherol; phosphorus compounds such as triphenylphosphite, diphenylnonylphenylphosphite, tris-(2,4-di-t-butylphenyl)phosphite, trisnonylphenylphosphite, tris-(mono- and di-mixed nonylphenyl)phosphite, diphenylisooctylphosphite, 2,2'-methylenebis(4,6-di-t-butylphenyl)octylphosphite, diphenylisodecylphosphite, phenyldiisodecylphosphite, diphenylmono(tridecyl)phosphite, 2,2'-ethylidenebis(4,6-di-t-butylphenol)fluorophosphite, phenyldiisodecylphosphite, phenyldi(tridecyl)phosphite, tris (2-ethylhexyl)phosphite, tris(isodecyl)phosphite, tris(tridecyl)phosphite, dibutyl hydrogen phosphite, trilauryltrithiophosphite, tetrakis(2,4-di-t-butylphenyl)-4,4'-biphenylenediphosphonite, 4,4'-isopropylidenediphenolalkyl(C12 to C15)phosphite, 4,4'-butylidenebis(3-methyl-6-t-butylphenyl)di-tridecylphosphite, distearyl-pentaerythritoldiphosphite, bis (nonylphenyl)pentaerythritoldiphosphite, bis(2,4-di-t-butylphenyl)pentaerythritoldiphosphite, cyclic neopentane tetrayl bis(2,4-di-t-butylphenylphosphite), phenyl-bisphenol A pentaerythritoldiphosphite, tetraphenyl dipropylene glycol diphosphite, 1,1,3-tris(2-methyl-4-di-tridecylphosphite-5-t-butylphenyl)butane, tetraphenyl tetra(tridecyl)pentaerythritol tetraphosphite, zinc dialkyldithiophosphate (ZnDTP), 3,4, 5,6-dibenzo-1,2-oxaphosphane-2-oxide, 3,5-di-t-butyl-4-hydroxybenzylphosphite-diethylester and a hydrogenated bisphenol A phosphite polymer; sulfur compounds such as dilauryl-3,3'-thiodipropionic acid ester (DLTTDP), ditridecyl-3,3'-thiodipropionic acid ester, dimyristyl-3,3'-thiodipropionic acid ester (DMTDP), distearyl-3,3'-thiodipropionic acid ester (DSTDP), laurylstearyl-3,3'-thiodipropionic acid ester, pentaerythritol tetra(β-lauryl-thiopropionate)ester, stearylthiopropionamide, bis[2-methyl-4-(3-n-alkyl(C12 to C14)thiopropionyloxy)-5-t-butylphenyl]sulfide, dioctadecyldisulfide, 2-mercaptonbenzimidazole, 2-mercapto-6-methylbenzimidazole and 1,1'-thiobis(2-naphthol); ascorbic acid; and the like.

The light stabilizer is typified by a benzotriazole compound, a benzophenone compound, a salicylate compound, cyanoacrylate, an oxalic acid derivative, a hindered amine compound (HALS) and a hindered phenol compound, some of which is used as the above-described antioxidant.

Examples of a suitable compound include benzotriazole compounds such as 2-(2'-hydroxy-5'-methylphenyl)benzotriazole, 3",4",2-(T-hydroxy-5'-t-octylphenyl)benzotriazole, 2-(T-hydroxy-4'-t-octoxyphenyl)benzotriazole, 2-(T-hydroxy-3',5'-di-t-butylphenyl)benzotriazole, 2-(2'-hydroxy-3', 5'-di-t-amylphenyl)benzotriazole, 2-(T-hydroxy-3'-dodecyl-5'-methylphenyl)benzotriazole, 2-(2'-hydroxy-3',5'-bis(α,α-dimethylbenzyl)phenylbenzotriazole, 2-[2'-hydroxy-3'-(3", 4",5",6"-tetraphthalimidemethyl)-5'-methylphenyl] benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2,2'-methylenebis[4-(1,1,3,3-tetramethylbutyl)-6-(2H-benzotriazole-2-yl)phenol, and a condensate of methyl-3-[3-t-butyl-5-(2H-benzotriazole-2-yl)-4-hydroxyphenylpropionate and polyethylene glycol (molecular weight: about 300); benzophenone compounds such as 2,4-dihydroxybenzophenone, 2-hydroxy-4-methoxybenzophenone, 2-hydroxy-4-n-octoxybenzophenone, 2-hydroxy-4-n-dodecyloxybenzophenone, 2-hydroxy-4-benzyloxybenzophenone, 2,2'-dihydroxy-4-methoxybenzophenone, 2-hydroxy-4-methoxy-2'-carboxybenzophenone, 2-hydroxy-4-methoxy-5-sulfoxybenzophenone, 2,2'-dihydroxy-4,4'-dimethoxybenzophenone, 2,2',4,4'-tetrahydroxybenzophenone, 2,2'-dihydroxy-4,4'-dimethoxy-5-sodiumsulfoxybenzophenone, bis(5-benzoyl-4-hydroxy-2-methoxyphenyl)methane, a polymer of 4-(2-acryloyloxyethoxy)-2-hydroxybenzophenone, and a mixture of 2,2'-dihydroxy-4,4'-dimethoxybenzophenone and other tetrasubstituted benzophenone; salicylate compounds such as phenylsalicylate, 2,5-di-t-butyl-4-hydroxybenzoic acid-n-hexadecylester, 4-t-butylphenylsalicylate, 4-t-octylphenyl-salicylate and 2,4-di-t-butylphenyl-3',5'-di-t-butyl-4'-hydroxybenzoate; cyanoacrylate compounds such as ethyl(β,β-diphenyl)cyanoacrylate and 2-ethylhexyl(β,β-diphenyl) cyanoacrylate; oxalic acid derivatives such as 2-ethoxy-2'-ethyloxalic acid bisanilide, 2-ethoxy-5-t-butyl-2'-ethyloxalic acid bisanilide and an oxalic acid anilide derivative; hindered amine (HALS) compounds such as [4-(4-hydroxy-3,5-di-t-butylphenyl)propionyl]-N-(4-hydroxy-3,5-di-t-butylphenyl) methyl-2,2,6,6-tetramethylpiperidine, 1,1'-(1,2-ethanediyl) bis(3,3,5,5-tetramethylpiperazineone), bis(2,2,6,6-tetramethyl-4-piperidinyl)sebacate, methyl-(N-methyl-2,2, 6,6-tetramethyl-piperidinyl)sebacate, bis-(N-methyl-2,2,6, 6-tetramethyl-piperidinyl)sebacate, decane diacid bis(2,2,6, 6-tetramethyl-1-(octyloxy)-4-piperidinyl)ester, bis(1,2,2,6, 6-pentamethyl-4-piperidyl)[[3,5-bis(1,1-dimethylethyl)-4-hydroxyphenyl]methyl]butylmalonate, a condensate of 1,2, 3,4-butanecarboxylic acid, 2,2,6,6-tetramethyl-4-piperidinol and tridecyl alcohol, a condensate of 1,2,3,4-butanecarboxylic acid, 1,2,2,6,6-pentamethyl-4-piperidinol and tridecyl alcohol, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, poly[[6-(1,1,3,3-tetramethylbutylamino)-1,3,5-triazine-2,4-diyl], [(2,2,6,6-tetramethylpiperidine)imino]hexamethylene[(2,2,6,6-tetramethylpiperidylimino]], poly[6-morpholino-s-triazine-2,4-diyl-2,2,6,6-tetramethylpiperidylimino-hexamethylene] [2,2,6,6-tetramethylpiperidylimino]], a condensate of 1,2,3, 4-butanetetracarboxylic acid, 2,2,6,6-tetramethyl-4-piperidinol and β,β,β',β'-tetramethyl-3,9-(2,4,8,10-tetraoxaspiro[5,5]undecane)diethanol; and semicarbazide compounds such as 1,6-hexamethylene bis(N,N-dimethylsemicarbazide) and 1,1,1',1'-tetramethyl-4,4'-(methylene-di-p-phenylene)disemicarbazide.

The polymerization inhibitor is typified by phenols, quinones, a nitro compound, a nitroso compound, amines and sulfides. Examples of a suitable compound include phenols such as hydroquinone, hydroquinonemonomethylether, mono-tert-butylhydroquinone, catechol, p-tert-butylcatechol, p-methoxyphenol, p-tert-butylcatechol, 2,6-di-tert-butyl-m-cresol, pyrogallol, β-naphthol and 4-methoxy-1-naphthol; quinones such as benzoquinone, 2,5-diphenyl-p-benzoquinone, p-toluquinone and p-xyloquinone; nitro compounds or nitroso compounds such as nitromethane, nitroethane, nitrobutane, nitrobenzene, a nitrobenzenesulfonic acid compound, m-dinitrobenzene, 2-methyl-2-nitrosopropane, α-phenyl-tert-butylnitrone and 5,5-dimethyl-1-pyrroline-1-oxide; amines such as chloranil-amine, diphenylamine, diphenylpicrylhydrazine, phenol-α-naphthylamine, pyridine and phenothiazine; and sulfides such as dithiobenzoylsulfide and dibenzyltetrasulfide.

Examples of the surfactant include non-ionic surfactants typified by: polyoxyalkylene alkyl ethers such as polyoxyethylene lauryl ether, polyoxyethylene cetyl ether, polyoxyethylene stearyl ether and polyoxyethylene oleyl ether; polyoxyalkylene alkylphenyl ethers such as polyoxyethylene octylphenyl ether and polyoxyethylene nonylphenyl ether; polyoxyalkylene alkylaminoethers such as polyoxyethylene laurylaminoether and polyoxyethylene stearylaminoether; sorbitan fatty acid esters such as sorbitan monolaurate, sorbitan monopalmitate, sorbitan monostearate and sorbitan monooleate; polyoxyalkylene sorbitan fatty acid esters such as polyoxyethylene sorbitan monolaurate, polyoxyethylene sorbitan monopalmitate, polyoxyethylene sorbitan monostearate and polyoxyethylene sorbitan monooleate; polyalkylene glycol fatty acid esters such as polyethylene glycol monolaurate, polyethylene glycol monooleate, polyethylene glycol monostearate, polyethylene glycol dilaurate and polyethylene glycol distearate; and glycerin fatty acid esters such as lauric acid monoglyceride, stearic acid monoglyceride and oleic acid monoglyceride. Also, examples of the surfactant include anionic surfactants typified by: sulfuric acid ester salts such as polyoxyethylene lauryl ether sulfate sodium, polyoxyethylene octyl phenyl ether sulfate sodium, polyoxyethylene nonyl phenyl ether sulfate sodium, laurylsulfuric acid triethanolamine, sodium lauryl sulfate, potassium lauryl sulfate and ammonium lauryl sulfate; sulfonic acid salts such as sodium dodecylbenzenesulfonate, sodium alkylnaphthalenesulfonate and sodium dialkylsulfosuccinate; and phosphoric acid ester salts such as potassium alkylphosphate. Also, examples of the surfactant include cationic surfactants typified by: quaternary ammonium salts such as lauryl trimethyl ammonium chloride, cetyl trimethyl ammonium chloride and stearyl trimethyl ammonium chloride. And, one, or two or more selected from the above examples can be used as the surfactant. Among them, polyoxyethylene lauryl ether, polyoxyethylene cetyl ether, polyoxyethylene stearyl ether, polyoxyethylene oleyl ether or a mixture thereof is particularly preferably exemplified.

The metallic pigment composition obtained by the present invention can also be used for organic solvent coatings, inks and the like. Additionally, the metallic pigment composition obtained by the present invention can be added to water-based coatings or water-based inks, in which resins as a coating film-forming component are dissolved or dispersed in a medium mainly containing water, thereby forming metallic water-based coatings or metallic water-based inks. The metallic pigment composition can also be kneaded with resins or the like and thus used as a waterproof binder or filler. The antioxidant, light stabilizer, polymerization inhibitor and surfactant may be added when the metallic pigment composition is blended in, for example, water-based coatings or water-based inks, or resins.

When the metallic pigment composition obtained by the present invention is used for coatings or inks, it may be added to (water-based) coatings or (water-based) inks as it is, but is preferably added thereto after being dispersed in a solvent in advance. The solvent here used includes water, texanol, diethylene glycol monobutyl ether, propylene glycol monomethyl ether and the like. Examples of the resins include acrylic resins, polyester resins, polyether resins, epoxy resins, fluorine resins and rosin resins.

Examples of the acrylic resins include (meth)acrylates such as methyl(meth)acrylate, ethyl(meth)acrylate, isopropyl (meth)acrylate, n-butyl(meth)acrylate, 2-ethylhexyl(meth) acrylate and lauryl(meth)acrylate; (meth)acrylates having active hydrogen, such as 2-hydroxyethyl(meth)acrylate, 2-hydroxypropyl(meth)acrylate, 2-hydroxybutyl(meth)acrylate, 3-hydroxypropyl(meth)acrylate and 4-hydroxybutyl (meth)acrylate; unsaturated carboxylic acids such as acrylic acid, methacrylic acid, maleic acid and itaconic acid; unsaturated amides such as acrylamide, N-methylolacrylamide and diacetoneacrylamide; and acrylic resins obtained by polymerizing one or a mixture selected from other polymerizable monomers such as glycidyl methacrylate, styrene, vinyltoluene, vinyl acetate, acrylonitrile, dibutyl fumarate, p-styrenesulfonic acid and allylsulfosuccinic acid.

A polymerization method is generally emulsion polymerization, but the acrylic resins can also be produced by suspension polymerization, dispersion polymerization or solution polymerization. The emulsion polymerization can also be stepwise polymerization.

Examples of the polyester resins include polyester resins obtained by condensation reaction of one or a mixture selected from the group of carboxylic acids such as succinic acid, adipic acid, sebacic acid, dimer acid, maleic anhydride, phthalic anhydride, isophthalic acid, terephthalic acid, trimellitic acid and pyromellitic acid, with one or a mixture of polyhydric alcohols selected from the group of diols such as ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethyl-hexanediol, 1,2-octanediol, 1,2-decanediol, 2,2,4-trimethylpentanediol, 2-butyl-2-ethyl-1,3-propanediol and 2,2-diethyl-1,3-propanediol, triols such as glycerin and trimethylolpropane, and tetraols such as diglycerin, dimethylolpropane and pentaerythritol; and polycaprolactones obtained by ring-opening polymerization of ε-caprolactone to a hydroxyl group of a low molecular weight polyol.

The polyether resins include polyether polyols obtained by adding one or a mixture of alkylene oxides such as ethylene oxide, propylene oxide, butylene oxide, cyclohexene oxide and styrene oxide to one or a mixture of polyhydric hydroxyl compounds by means of a strong basic catalyst such as hydroxide of lithium, sodium, potassium or the like, alcoholate or alkylamine; polyether polyols obtained by reacting alkylene oxide with a polyfunctional compound such as ethylenediamines; polyether polyols obtained by ring-opening polymerization of cyclic ethers such as tetrahydrofuran; so-called polymer polyols obtained by polymerizing acrylamide or the like by using these polyethers as a medium; and the like.

These resins are preferably emulsified, dispersed or dissolved in water. Thus, carboxyl groups, sulfone groups and the like contained in the resins can be neutralized.

As a neutralizer for neutralizing the carboxyl groups, the sulfone groups and the like, at least one selected from, for example, ammonia, and water-soluble amino compounds such as monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine and morpholine can be used. Preferably, triethylamine and dimethylethanolamine which are tertiary amines, and the like can be used.

Preferable resins are acrylic resins and polyester resins.

A melamine curing agent, an isocyanate curing agent, and a resin such as urethane dispersion can be used in combination, if necessary. Furthermore, an inorganic pigment, an organic pigment, an extender pigment, a silane coupling agent, a titanium coupling agent, a dispersant, an antisettling agent, a leveling agent, a thickening agent, and a defoamer, which are generally added to coatings, can be combined. The surfactant may be further added in order to make dispersibility in coatings better. Also, the antioxidant, the light stabilizer and the polymerization inhibitor may be further added in order to make storage stability of coatings better.

EXAMPLES

Hereinafter, Examples of the present invention will be illustrated.

Example 1

To 135 g of a commercially available aluminum paste (produced by Asahi Kasei Chemicals Corporation, trade name "GX-3100 (average particle diameter: 10.5 μm, nonvolatile content: 74%)") was added 465 g of ethylene glycol monobutyl ether and dispersed therein to form a slurry, and a solution of 1.0 g of a hydrate of phosphotungstomolybdic acid ($H_3PW_6Mo_6O_{40}$) in 30 g of ethylene glycol monobutyl ether was gradually added while stirring the slurry, and the resultant was stirred for 2 hours while maintaining the slurry temperature at 70° C. Thereafter, 10.0 g of tetraethoxysilane was further added, then 3.2 g of 25% ammonia water and 5.2 g of distilled water were added thereto, and the resultant was stirred for 2 hours. Thereafter, the resultant was heated to a temperature of 140° C. and stirred for 4 hours. After the completion of the reaction, the obtained slurry was filtered after cooling, thereby obtaining an aluminum pigment composition having a nonvolatile content of 60%. The obtained aluminum pigment composition was dissolved in 1 mol/L hydrochloric acid, the content of each element was measured by ICP emission spectroscopy, and as a result, it was found that the content of W was 0.31 parts by weight, the content of Mo was 0.16 parts by weight, and the content of Si was 1.01 parts by weight, based on 100 parts by weight of Al.

Example 2

A tridecyl acid phosphate morpholine salt (3.0 parts by weight) was added based on 100 parts by weight of an aluminum metal component in the aluminum pigment composition obtained in Example 1, and the resultant was kneaded at 40° C. for 2 hours to obtain an aluminum pigment composition.

Example 3

To 135 g of a commercially available aluminum paste (produced by Asahi Kasei Chemicals Corporation, trade name "GX-3100 (average particle diameter: 10.5 μm, nonvolatile content: 74%)") was added 465 g of propylene glycol monomethyl ether acetate and dispersed therein to form a slurry, and a solution of 2.0 g of a hydrate of silicotungstomolybdic acid ($H_4SiW_3Mo_9O_{40}$) in 30 g of propylene glycol monomethyl ether was gradually added while stirring the slurry, and the resultant was stirred for 2 hours while maintaining the slurry temperature at 40° C. Thereafter, 10.0 g of tetraethoxysilane was added, then 3.2 g of 25% ammonia water and 5.2 g of distilled water were added, and the resultant was further stirred for 2 hours. Thereafter, 5.0 g of trifluoropropyltrimethoxysilane was added in the state of being previously hydrolyzed by an aqueous 1 mol/L acetic acid solution and the resultant was heated to a temperature of 130° C., and the resultant was stirred for 12 hours. After the completion of the reaction, the obtained slurry was filtered after cooling, thereby obtaining an aluminum pigment composition having a nonvolatile content of 55%. Furthermore, 0.5 parts by weight of 2,6-di-t-butyl-p-cresol was added based on 100 parts by weight of an aluminum metal component in the aluminum pigment composition, and the resultant was kneaded. The obtained aluminum pigment composition was subjected to aging at 50° C. for 1 week. The content of each element in this aluminum pigment composition was measured in the same manner as Example 1, and it was found that the content of W was 0.34 parts by weight, the content of Mo was 0.53 parts by weight, and the content of Si was 1.50 parts by weight, based on 100 parts by weight of Al.

Example 4

To 135 g of a commercially available aluminum paste (produced by Asahi Kasei Chemicals Corporation, trade name "GX-3100 (average particle diameter: 10.5 μm, nonvolatile content: 74%)") was added 465 g of propylene glycol monomethyl ether and dispersed therein to form a slurry, and a solution of 0.5 g of a hydrate of sodium phosphor vanado molybdate ($Na_4PV_1Mo_{11}O_{40}$) in 30 g of water was gradually added while stirring the slurry, and the resultant was stirred for 30 minutes while maintaining the slurry temperature at 40° C. Thereafter, 10.0 g of tetraethoxysilane was added, then 8.0 g of N,N-dimethylethanolamine and 6.0 g of distilled water were added, and the resultant was stirred for 1 hour. Thereafter, the resultant was heated to a temperature of 100° C. and stirred for 12 hours. Furthermore, 5.0 g of 3-methacryloxypropyltrimethoxysilane previously hydrolyzed by an aqueous 1 mol/L acetic acid solution was added and the resultant was stirred for 8 hours. After the completion of the reaction, the obtained slurry was filtered after cooling, thereby obtaining an aluminum pigment composition having a nonvolatile content of 58%. The content of each element in this aluminum pigment composition was measured in the same manner as Example 1, and it was found that the content of V was 0.01 parts by weight, the content of Mo was 0.18 parts by weight, and the content of Si was 1.43 parts by weight, based on 100 parts by weight of Al.

Example 5

To 135 g of a commercially available aluminum paste (produced by Asahi Kasei Chemicals Corporation, trade name "GX-3100 (average particle diameter: 10.5 μm, nonvolatile content: 74%)") was added 465 g of ethylene glycol monobutyl ether and dispersed therein to form a slurry, and 1.0 g of a hydrate of ammonium phosphor vanado molybdate (($NH_4$)$_4PV_1Mo_{11}O_{40}$) was added in the state of being dispersed in 30 g of water while stirring the slurry, and stirred for 30 minutes while maintaining the slurry temperature at 40° C. Thereafter, 16.0 g of 25% ammonia water was added thereto, and the resultant was stirred for 1 hour. Thereafter, 10.0 g of tetraethoxysilane and 5.0 g of 3-glycidoxypropyltrimethoxysilane were further added thereto, and the resultant was stirred for 2 hours. Thereafter, the resultant was heated to a temperature of 150° C. and stirred for 6 hours. After the completion of the reaction, the obtained slurry was filtered after cooling, thereby obtaining an aluminum pigment composition having a nonvolatile content of 61%. The content of each element in this aluminum pigment composition was measured in the same manner as Example 1, and it was found that the content of V was 0.02 parts by weight, the content of Mo was 0.35 parts by weight, and the content of Si was 1.45 parts by weight, based on 100 parts by weight of Al.

Example 6

To 135 g of a commercially available aluminum paste (produced by Asahi Kasei Chemicals Corporation, trade name "GX-3100 (average particle diameter: 10.5 μm, nonvolatile content: 74%)") were added a ditridecylamine salt of phosphotungstomolybdic acid ($H_3PW_6Mo_6O_{40}$) (mixture of branched isomers) and 2,6-di-t-butyl-p-cresol so that the amounts of the salt and the cresol were 3.0 parts by weight and 0.5 parts by weight, respectively, based on 100 parts by weight of an aluminum metal component in the aluminum paste, and the resultant was kneaded at 70° C. for 6 hours.

To 135 g of the obtained aluminum particle composition was added 465 g of ethylene glycol monobutyl ether, and the resultant was stirred for 30 minutes while maintaining the slurry temperature at 70° C. Thereafter, 10.0 g of tetraethoxysilane was added, then 3.2 g of 25% ammonia water and 5.2 g of distilled water were added, and the resultant was stirred for additional 2 hours. Thereafter, the resultant was heated to a temperature of 140° C. and stirred for 4 hours. After the completion of the reaction, the obtained slurry was filtered after cooling, thereby obtaining an aluminum pigment composition having a nonvolatile content of 60%. The content of each element in this aluminum pigment composition was measured in the same manner as Example 1, and it was found that the content of W was 1.00 part by weight, the content of Mo was 0.51 parts by weight, and the content of Si was 1.05 parts by weight, based on 100 parts by weight of Al.

Example 7

To 135 g of a commercially available aluminum paste (produced by Asahi Kasei Chemicals Corporation, trade name "GX-3100 (average particle diameter: 10.5 μm, nonvolatile content: 74%)") was added a ditridecylamine salt of phosphotungstomolybdic acid ($H_3PW_6Mo_6O_{40}$) (mixture of branched isomers) so that the amount of the salt was 1.0 part by weight based on 100 parts by weight of an aluminum metal component in the aluminum paste, and the resultant was kneaded at 70° C. for 6 hours.

To 135 g of the obtained aluminum particle composition was added 465 g of ethylene glycol monobutyl ether, and the resultant was stirred for 30 minutes while maintaining the slurry temperature at 70° C. Thereafter, 5.0 g of tetraethoxysilane and 5.0 g of 3-aminopropyl trimethoxysilane were further added, then 5.2 g of distilled water was added, and the resultant was stirred for additional 2 hours. Thereafter, the resultant was heated to a temperature of 140° C. and stirred for 4 hours. After the completion of the reaction, the obtained slurry was filtered after cooling, thereby obtaining an aluminum pigment composition having a nonvolatile content of 60%. The content of each element in this aluminum pigment composition was measured in the same manner as Example 1, and it was found that the content of W was 0.28 parts by weight, the content of Mo was 0.13 parts by weight, and the content of Si was 0.9 parts by weight, based on 100 parts by weight of Al.

Example 8

To 135 g of a commercially available aluminum paste (produced by Asahi Kasei Chemicals Corporation, trade name "GX-3100 (average particle diameter: 10.5 μm, nonvolatile content: 74%)") was added a monooctylamine salt of phosphotungstomolybdic acid ($H_3PW_6Mo_6O_{40}$) so that the amount of the salt was 2.0 parts by weight based on 100 parts by weight of an aluminum metal component in the aluminum paste, and the resultant was stirred at 70° C. for 6 hours.

To 135 g of the obtained aluminum particle composition was added 465 g of ethylene glycol monobutyl ether, and the resultant was stirred for 30 minutes while maintaining the slurry temperature at 40° C. Thereafter, 8.0 g of triethanolamine was added and the resultant was stirred for 1 hour. Thereafter, 5.0 g of tetraethoxysilane and 5.0 g of hexyltrimethoxysilane were further added, then 5.5 g of distilled water was added, and the resultant was stirred for 2 hours. Thereafter, the resultant was heated to a temperature of 140° C. and stirred for 6 hours. After the completion of the reaction, the obtained slurry was filtered after cooling, thereby obtaining an aluminum pigment composition having a nonvolatile content of 62%. The content of each element in this aluminum pigment composition was measured in the same manner as Example 1, and it was found that the content of W was 0.75 parts by weight, the content of Mo was 0.40 parts by weight, and the content of Si was 1.10 parts by weight, based on 100 parts by weight of Al.

Example 9

To 135 g of a commercially available aluminum paste (produced by Asahi Kasei Chemicals Corporation, trade name "GX-3100 (average particle diameter: 10.5 μm, nonvolatile content: 74%)") were added an N,N-dimethylethanolamine salt of phosphovanadomolybdic acid ($H_4PV_1Mo_{11}O_{40}$) and ascorbic acid so that the amounts of the salt and the ascorbic acid were 1.0 part by weight and 0.5 parts by weight, respectively, based on 100 parts by weight of an aluminum metal component in the aluminum paste, and the resultant was stirred at 70° C. for 6 hours.

To 135 g of the obtained aluminum particle composition was added 465 g of ethylene glycol monobutyl ether, and the resultant was stirred for 30 minutes while maintaining the slurry temperature at 70° C. Thereafter, 5.0 g of tetraethoxysilane and 5.0 g of phenyltrimethoxysilane were added in the state of being previously hydrolyzed by an aqueous 1 mol/L acetic acid solution, and the resultant was heated to a temperature of 130° C. and stirred for 12 hours. After the completion of the reaction, the obtained slurry was filtered after cooling, thereby obtaining an aluminum pigment composition having a nonvolatile content of 52%. The content of each element in this aluminum pigment composition was measured in the same manner as Example 1, and it was found that the content of V was 0.02 parts by weight, the content of Mo was 0.45 parts by weight, and the content of Si was 1.07 parts by weight, based on 100 parts by weight of Al.

Example 10

To 135 g of a commercially available aluminum paste (produced by Asahi Kasei Chemicals Corporation, trade name "GX-3160 (average particle diameter: 16 μm, nonvolatile content: 74%)") were added 465 g of toluene and 4.0 g of N,N-dimethylbenzylamine, and the resultant was stirred for 30 minutes while maintaining the slurry temperature at 50° C. Thereafter, 2.0 g of dimethyldichlorosilane was added and the resultant was stirred for 18 hours. Thereafter, a solution of 1.0 g of a hydrate of silicotungstomolybdic acid ($H_4SiW_3Mo_9O_{40}$) in 30 g of isopropanol was gradually added and the resultant was stirred for 6 hours. Thereafter, the resultant was heated to a temperature of 100° C., and 5.0 g of tetraethoxysilane and 2.5 g of N-methyl-3-aminopropyl-trimethoxysilane previously hydrolyzed by 1 mol/L hydrochloric acid were added and the resultant was stirred for 6 hours. After the completion of the reaction, the obtained slurry was filtered after cooling, thereby obtaining an aluminum pigment composition having a nonvolatile content of 65%. The content of each element in this aluminum pigment composition was measured in the same manner as Example 1, and it was found that the content of W was 0.17 parts by weight, the content of Mo was 0.26 parts by weight, and the content of Si was 1.15 parts by weight, based on 100 parts by weight of Al.

Example 11

To 135 g of a commercially available aluminum paste (produced by Asahi Kasei Chemicals Corporation, trade name "GX-3160 (average particle diameter: 16 μm, nonvolatile content: 74%)") was added 465 g of ethylene glycol monobutyl ether and dispersed therein to form a slurry, and 0.5 g of a hydrate of phosphovanadomolybdic acid ($H_4PV_1Mo_{11}O_{40}$) was added while stirring the slurry, and the resultant was stirred for 2 hours while maintaining the slurry temperature at 70° C. Thereafter, 5.0 g of tetraethoxysilane was added and then the resultant was stirred for 8 hours. During this operation, 5.0 g of an aqueous phosphoric acid solution diluted to 20% was continuously added over 2 hours. After the completion of the reaction, the obtained slurry was filtered after cooling, thereby obtaining an aluminum pigment composition having a nonvolatile content of 60%.

The content of each element in this aluminum pigment composition was measured in the same manner as Example 1, and it was found that the content of V was 0.01 parts by weight, the content of Mo was 0.20 parts by weight, and the content of Si was 0.60 parts by weight, based on 100 parts by weight of Al.

Example 12

Polyphosphoric acid (2.0 parts by weight) was added based on 100 parts by weight of an aluminum metal component in the aluminum pigment composition obtained in Example 11, and the resultant was kneaded at 40° C. for 2 hours to obtain an aluminum pigment composition.

Example 13

To 135 g of a commercially available aluminum paste (produced by Asahi Kasei Chemicals Corporation, trade name "GX-3160 (average particle diameter: 16 μm, nonvolatile content: 74%)") was added a triethanolamine salt of silicotungstomolybdic acid ($H_4SiW_3Mo_9O_{40}$) so that the amount of the salt was 1.0 part by weight based on 100 parts by weight of an aluminum metal component in the aluminum paste, and was also added 5.0 parts by weight of a methoxy-modified methylphenylsilicone oligomer (produced by Shin-Etsu Chemical Co., Ltd., trade name "KR-213") and the resultant was kneaded at 70° C. for 12 hours to obtain an aluminum pigment composition. The content of each element in this aluminum pigment composition was measured in the same manner as Example 1, and it was found that the content of W was 0.22 parts by weight, the content of Mo was 0.39 parts by weight, and the content of Si was 0.90 parts by weight, based on 100 parts by weight of Al.

Comparative Example 1

The same procedure as Example 1 was performed except that the step of adding tetraethoxysilane was not used, thereby obtaining an aluminum pigment composition having a nonvolatile content of 73%. The content of each element in this aluminum pigment composition was measured in the same manner as Example 1, and it was found that the content of W was 0.32 parts by weight, the content of Mo was 0.16 parts by weight, and the content of Si was 0.00 parts by weight, based on 100 parts by weight of Al.

Comparative Example 2

The same procedure as Example 1 was performed except that the step of adding a hydrate of phosphotungstomolybdic acid ($H_3PW_6Mo_6O_{40}$) was not used, thereby obtaining an aluminum pigment composition having a nonvolatile content of 60%. The content of each element in this aluminum pigment composition was measured in the same manner as Example 1, and it was found that the content of W was 0.00 parts by weight, the content of Mo was 0.00 parts by weight, and the content of Si was 0.40 parts by weight, based on 100 parts by weight of Al.

Comparative Example 3

The same procedure as Example 1 was performed except that, phosphomolybdic acid was added instead of 1.0 g of a hydrate of phosphotungstomolybdic acid ($H_3PW_6Mo_6O_{40}$), 0.8 g of a hydrate of phospho molybdic acid ($H_3PMo_{12}O_{40}$) which is the same molar number was added, thereby obtaining an aluminum pigment composition having a nonvolatile content of 61%. The content of each element in this aluminum pigment composition was measured in the same manner as Example 1, and it was found that the content of Mo was 0.30 parts by weight and the content of Si was 1.00 part by weight, based on 100 parts by weight of Al.

Comparative Example 4

A commercially available aluminum paste (produced by Asahi Kasei Chemicals Corporation, trade name "GX-3100 (average particle diameter: 10.5 μm, nonvolatile content: 74%)") was used as it is to prepare a metallic coating as described below.

Example 14

To 167 g of the aluminum pigment composition obtained in Example 1 was added 700 g of mineral spirit and dispersed therein to form a slurry, and the slurry was stirred for 30 minutes while maintaining the slurry temperature at 70° C. Then, 0.75 g of acrylic acid was added and the resultant was stirred for 30 minutes. Thereafter, 5.6 g of trimethylolpropane triacrylate (TMPTA), 2.4 g of di-trimethylolpropane tetraacrylate (DTMPTA) and 3.0 g of 2,2'-azobis-2,4-dimethylvaleronitrile (ADVN) were dissolved in 80 g of mineral spirit, and the obtained solution was added over 3 hours. Thereafter, stirring was continued for additional 2 hours. After the completion of the reaction, the obtained slurry was filtered after cooling, thereby obtaining 200 g of an aluminum pigment composition having a nonvolatile content of 55%.

Example 15

Tridecyl acid phosphate (3.0 parts by weight) was added based on 100 parts by weight of an aluminum metal component in the aluminum pigment composition obtained in Example 14, and the resultant was kneaded at 40° C. for 2 hours to obtain an aluminum pigment composition.

Example 16

The same procedure as Example 11 was performed except that 167 g of the aluminum pigment composition obtained in Example 1 was changed to 182 g of the aluminum pigment composition obtained in Example 2, 0.75 g of acrylic acid was changed to 1.50 g of 2-isocyanatoethyl acrylate, and 1.0 g of benzyl acrylate was added in addition to TMPTA and DTMPTA, thereby obtaining 213 g of an aluminum pigment composition having a nonvolatile content of 52.1%.

Example 17

To 172 g of the aluminum pigment composition obtained in Example 3 was added 700 g of mineral spirit and dispersed therein to form a slurry, and the slurry was stirred for 30 minutes while maintaining the slurry temperature at 70° C. Thereafter, 5.6 g of TMPTA, 2.4 g of DTMPTA and 3.0 g of ADVN were dissolved in 80 g of mineral spirit, and the obtained solution was added over 3 hours. Thereafter, stirring was continued for additional 2 hours. After the completion of the reaction, the obtained slurry was filtered after cooling, thereby obtaining 195 g of an aluminum pigment composition having a nonvolatile content of 56%.

Example 18

The same procedure as Example 11 was performed except that 167 g of the aluminum pigment composition obtained in Example 1 was changed to 164 g of the aluminum pigment composition obtained in Example 4, DTMPTA was changed to pentaerythritol tetraacrylate, and 1.0 g of divinylbenzene was further added, thereby obtaining 189 g of an aluminum pigment composition having a nonvolatile content of 58.4%.

Example 19

To 135 g of a commercially available aluminum paste (produced by Asahi Kasei Chemicals Corporation, trade name "GX-3100 (average particle diameter: 10.5 μm, nonvolatile content: 74%)") were added a ditridecylamine salt of phosphotungstomolybdic acid ($H_3PW_6Mo_6O_{40}$) and 2,6-di-t-butyl-p-cresol so that the amounts of the salt and the cresol were 3.0 parts by weight and 0.5 parts by weight, respectively, based on 100 parts by weight of an aluminum metal component in the aluminum paste, and the resultant was kneaded at 70° C. for 6 hours.

The same procedure as Example 11 was performed except that this resultant was used instead of the aluminum pigment composition obtained in Example 1, 0.75 g of acrylic acid was changed to 2.0 g of 2-acryloyloxyethyl acid phosphate, 5.6 g of TMPTA was changed to 2.8 g of trimethylolpropane trimethacrylate, the amount of DTMPTA was changed from 2.4 g to 1.2 g, and 1.0 g of glycidyl methacrylate was further added, thereby obtaining 189 g of an aluminum pigment composition having a nonvolatile content of 57.3%.

Examples 20 to 38

Comparative Examples 5 to 8

With respect to the aluminum pigment compositions obtained in Examples 1 to 19, and the aluminum pigment compositions obtained in Comparative Examples 1 to 4, water-based metallic coatings each having the following composition were prepared. Herein, the results thereof were defined as Examples 22 to 42 and Comparative Examples 5 to 8.

[Preparation of Water-Based Metallic Coatings]

Water-based metallic coatings each having the following components were prepared.

Aluminum pigment composition: 12.0 g as nonvolatile content

Diethylene glycol monobutyl ether: 18.0 g

Polyoxyethylene lauryl ether (non-ionic surfactant) (produced by Matsumoto Yushi-Seiyaku Co., Ltd., trade name "Actinol L5"): 6.0 g Distilled water: 12.0 g Acrylic emulsion (acid value: 13 mgKOH/g, hydroxyl value: 40 mgKOH/g, Tg: 20° C., solid content: 42%, number average molecular weight: 100,000, pH: 8.4): 240 g The above components were mixed, and then the pH was adjusted from 7.7 to 7.8 by ammonia water and the viscosity was adjusted from 650 to 750 mPa·s (Brookfield-type viscometer, No. 3 rotor, 60 rpm, 25° C.) by a carboxylic acid-type thickening agent and distilled water.

The prepared water-based metallic coatings were used to perform the following evaluations.

[Evaluation 1 (Coating Stability)]

The coatings prepared by the above formulation were visually evaluated in terms of changes in state after being left to stand at 23° C. for 24 hours.

○: no change was particularly observed.

Δ: aggregation of aluminum pigments was slightly observed.

x: aggregation of aluminum pigments was observed.

[Evaluation 2 (Storage Stability (Gas Generation) Evaluation)]

Each water-based metallic coating (200 g) was taken in a flask, the flask was placed in a constant temperature water bath at 40° C., and the cumulative amount of hydrogen gas generated was observed until the elapse of 24 hours. The following criteria were used to evaluate the amount of the gas generated, and were assumed to be an index of storage stability in each coating.

⊙: 0 ml in the range of experimental error (±about 0.5 ml)

○: less than 1.0 ml

Δ: 1.0 ml or more and less than 5.0 ml x: 5.0 ml or more and less than 20 ml x x: 20 ml or more

[Evaluation 3 (Coating Film Color Tone Evaluation)]

The above coatings were used to form coating films, and each film was evaluated for brightness and flip-flop feeling.

<Brightness>

Brightness was evaluated by using a laser-type metallic feeling measuring apparatus manufactured by Kansai Paint Co., Ltd., Alcope LMR-200. The apparatus includes a laser light source having an incident angle of 45 degrees, a light receiver having an acceptance angle of 0 degrees and a light receiver having an acceptance angle of −35 degrees as optical conditions. With respect to a measurement value, an IV value was determined at an acceptance angle of −35 degrees, where the maximum intensity of light is obtained, in the reflected laser light subtracted by the light in the specular reflection region where the laser light is reflected on the surface of the coating film. The IV value is a parameter which is proportional to the intensity of regularly reflected light from the coating film, and indicates the magnitude of brightness of light. The judging criteria are as follows.

⊙: higher than Comparative Example 5 by 20 or more

○: difference from Comparative Example 5 being +10 to 20

Δ: difference from Comparative Example 5 being less than ±10 x: lower than Comparative Example 5 by 10 or more

<Flip-Flop Feeling (FF)>

Flip-flop feeling was evaluated by using a variable angle color meter manufactured by Suga Test Instruments Co., Ltd. An F/F value was determined from the slopes of the logarithms of the reflected light intensities (L values) at observation angles (acceptance angles) of 30 degrees and 80 degrees against a light source having an incident angle of 45 degrees. The F/F value is a parameter which is proportional to the orientation degree of a metallic pigment, and indicates the magnitude of the flip-flop feeling of the pigment. The judging criteria are as follows.

⊙: higher than Comparative Example 5 by 0.1 or more

○: difference from Comparative Example 5 being +0.05 to 0.1

Δ: difference from Comparative Example 5 being less than ±0.05 x: lower than Comparative Example 5 by 0.05 or more

<Hiding Power>

Coating films each applied on a PET sheet were visually judged.

○: more excellent than standard x: equal to or less excellent than standard

[Evaluation 4 (Evaluation of Discoloration Resistance of Dye)]

To 5 g of each aluminum pigment composition was added 20 ml of an aqueous methylene blue solution (0.04 mmol/L), and warmed at 40° C. for 24 hours. Then, this solution was filtered and visually evaluated for the degree of discoloration of blue color.

○: No remarkable discoloration was observed.

Δ: Slight discoloration was observed.

x: decoloration was observed.

The results of Evaluations 1 to 4 are shown in Table 1.

TABLE 1

| | Pigment composition used | Evaluation 1 Coating stability | Evaluation 2 Storage stability | Evaluation 3 Brightness | FF | Hiding power | Evaluation 4 Discoloration resistance of dye |
|---|---|---|---|---|---|---|---|
| Example 20 | Example 1 | ○ | ○ | ⊙ | ⊙ | ○ | ○ |
| Example 21 | Example 2 | ○ | ⊙ | ⊙ | ⊙ | ○ | ○ |
| Example 22 | Example 3 | ○ | ⊙ | ⊙ | ⊙ | ○ | ○ |

TABLE 1-continued

| | Pigment composition used | Evaluation 1 Coating stability | Evaluation 2 Storage stability | Evaluation 3 Brightness | FF | Hiding power | Evaluation 4 Discoloration resistance of dye |
|---|---|---|---|---|---|---|---|
| Example 23 | Example 4 | ○ | ○ | ◎ | ○ | ○ | ○ |
| Example 24 | Example 5 | ○ | ○ | ○ | ◎ | ○ | ○ |
| Example 25 | Example 6 | ○ | ◎ | ◎ | ◎ | ◎ | ○ |
| Example 26 | Example 7 | ○ | ○ | ○ | ○ | ○ | ○ |
| Example 27 | Example 8 | ○ | ◎ | ◎ | ◎ | ◎ | ○ |
| Example 28 | Example 9 | ○ | ○ | ◎ | ◎ | ◎ | ○ |
| Example 29 | Example 10 | ○ | ○ | ○ | ○ | ○ | ○ |
| Example 30 | Example 11 | ○ | ○ | ◎ | ◎ | ○ | ○ |
| Example 31 | Example 12 | ○ | ◎ | ○ | ○ | ○ | ○ |
| Example 32 | Example 13 | ○ | ○ | ○ | ○ | ○ | ○ |
| Example 33 | Example 14 | ○ | ◎ | ○ | ○ | ○ | ○ |
| Example 34 | Example 15 | ○ | ◎ | ○ | ◎ | ○ | ○ |
| Example 35 | Example 16 | ○ | ◎ | ◎ | ◎ | ○ | ○ |
| Example 36 | Example 17 | ○ | ◎ | ○ | ○ | ○ | ○ |
| Example 37 | Example 18 | ○ | ◎ | ○ | ○ | ○ | ○ |
| Example 38 | Example 19 | ○ | ◎ | ○ | ○ | ○ | ○ |
| Comparative Example 5 | Comparative Example 1 | Δ | X | 450 | 1.8 | Standard | Δ |
| Comparative Example 6 | Comparative Example 2 | Δ | X | X | Δ | X | ○ |
| Comparative Example 7 | Comparative Example 3 | ○ | Δ | Δ | Δ | X | X |
| Comparative Example 8 | Comparative Example 4 | X | X X | X | X | X | ○ |

Examples 39 to 44

Comparative Example 9

With respect to the aluminum pigment compositions containing an organic oligomer or polymer, obtained in Examples 14 to 19 and Comparative Example 1, the following adhesion and chemical resistance tests were performed. Herein, the results thereof were defined as Examples 39 to 44 and Comparative Example 9.

[Preparation of Metallic Coating]

Metallic coatings each having the following components were prepared.

Aluminum pigment composition: 5 g as a nonvolatile content Thinner (produced by Musashi Paint Co., Ltd., trade name "Pla Ace thinner No. 2726"): 50 g Acrylic resin (produced by Musashi Paint Co., Ltd., trade name "Pla Ace No. 7160"): 33 g

[Evaluation]

An ABS resin plate was coated with each prepared metallic coating by using an air-spray apparatus so that the thickness of a film to be dried was 10 μm, and dried in an oven at 60° C. for 30 minutes to obtain a coated plate for evaluation.

The coated plate for evaluation was used to perform the following evaluation.

[Evaluation 5 (Adhesion)]

Cellotape (registered trademark, manufactured by Nichiban Co., Ltd., CT-24) was adhered to the coating film on the coated plate for evaluation and pulled at an angle of 45 degrees, and the degree of the aluminum pigment particles peeled was visually observed. The judging criteria are as follows.

○: no peeling
Δ: slightly peeling
x: peeling

[Evaluation 6 (Chemical Resistance)]

The lower half of the coated plate for evaluation was immersed in a beaker into which an aqueous 0.1 N—NaOH solution was loaded, and left to stand at 55° C. for 4 hours. The coated plate after testing was washed with water and dried, and then colors of the immersed portion and the unimmersed portion were measured under Condition d (8-d method) of JIS-Z-8722 (1982) to determine color difference ΔE according to 6.3.2 of JIS-Z-8730 (1980). The judging was as follows depending on values of color difference ΔE. (The smaller values are more favorable.)

○: less than 1.0
x: 1.0 or more

The results are shown in Table 2.

TABLE 2

| | Pigment composition used | Evaluation 5 Adhesion | Evaluation 6 Chemical resistance |
|---|---|---|---|
| Example 39 | Example 14 | ○ | ○ |
| Example 40 | Example 15 | ○ | ○ |
| Example 41 | Example 16 | ○ | ○ |
| Example 42 | Example 17 | ○ | ○ |
| Example 43 | Example 18 | ○ | ○ |
| Example 44 | Example 19 | ○ | ○ |
| Comparative Example 9 | Comparative Example 1 | X | X |

INDUSTRIAL APPLICABILITY

The present invention can provide a metallic pigment composition that can be used in coating compositions, ink compositions or the like, in particular, water-based coatings, water-based inks or the like, that is excellent in storage stability of coatings with less deterioration in photoluminescence, hiding power, flip-flop feeling and the like when forming a coating film.

The invention claimed is:

1. A metallic pigment composition comprising one or more mixed-coordination type heteropolyanion compounds, a hydrolysate of a silicon-containing compound and/or a condensate thereof, and metallic particles, wherein a heteroatom constituting the mixed-coordination type heteropolyanion compound is at least one selected from elements of Group IIIB, Group IVB, and Group VB, and wherein a polyatom constituting the mixed-coordination type heteropolyanion compound is selected from transition metals.

2. The metallic pigment composition according to claim 1, further comprising at least one selected from the group consisting of an organic oligomer or polymer.

3. The metallic pigment composition according to claim 1 or 2, further containing one or more selected from the group consisting of (i) inorganic phosphoric acids or salts thereof; and (ii) acidic organic phosphoric or phosphorous acid esters or salts thereof.

4. The metallic pigment composition according to claim 1, wherein the metallic particles are made of aluminum.

5. The metallic pigment composition according to claim 1, wherein the mixed-coordination type heteropolyanion compound is at least one mixed-coordination type heteropoly acid selected from $H_3PW_xMo_{12-x}O_{40} \cdot nH_2O$ (phosphotungstomolybdic acid.n-hydrate), $H_{3+x}PV_xMo_{12-x}O_{40} \cdot nH_2O$ (phosphovanadomolybdic acid.n-hydrate), $H_4SiW_xMo_{12-x}O_{40} \cdot nH_2O$ (silicotungstomolybdic acid.n-hydrate), and $H_{4+x}SiV_xMo_{12-x}O_{40} \cdot nH_2O$ (silicovanadomolybdic acid.n-hydrate); and $1 \le x \le 11$ and $n \ge 0$.

6. The metallic pigment composition according to claim 1, wherein the mixed-coordination type heteropolyanion compound is a salt of a mixed-coordination type heteropoly acid with at least one selected from alkali metals, alkaline earth metals, ammonia, and amine compounds represented by the following general formula (1):

[Formula 1]

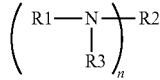
(1)

wherein R1, R2 and R3 may be the same or different, and are each a hydrogen atom, or a mono or divalent hydrocarbon group having 1 to 30 carbon atoms that may optionally contain an ether bond, an ester bond, a hydroxyl group, a carbonyl group, and a thiol group, R1 and R2 are optionally taken together to form a 5-membered or 6-membered cycloalkyl group, or are taken together with a nitrogen atom to form a 5-membered or 6-membered ring that is capable of additionally containing a nitrogen or oxygen atom as a crosslinking member, or R1, R2 and R3 are taken together to form a multi-membered multiring composition that is capable of containing one or more additional nitrogen atoms and/or oxygen atoms as a crosslinking member, and R1, R2 and R3 are not a hydrogen atom at the same time; and n represents a numerical value of 1 to 2.

7. The metallic pigment composition according to claim 6, wherein the mixed-coordination type heteropoly acid is at least one mixed-coordination type heteropoly acid selected from $H_3PW_xMo_{12-x}O_{40} \cdot nH_2O$ (phosphotungstomolybdic acid.n-hydrate), $H_{3+x}PV_xMo_{12-x}O_{40} \cdot nH_2O$ (phosphovanadomolybdic acid.n-hydrate), $H_4SiW_xMo_{12-x}O_{40} \cdot nH_2O$ (silicotungstomolybdic acid.n-hydrate), and $H_{4+x}SiV_xMo_{12-x}O_{40} \cdot nH_2O$ (silicovanadomolybdic acid.n-hydrate); and $1 \le x \le 11$ and $n \ge 0$.

8. The metallic pigment composition according to claim 1, wherein the silicon-containing compound is at least one selected from compounds represented by the following general formula (2), (3), (4) or (5) and a partial condensate thereof:

[Formula 2]

$$R4_mSi(OR5)_{4-m} \quad (2)$$

wherein R4 is a hydrogen atom or a hydrocarbon group having 1 to 30 carbon atoms that may optionally contain a halogen group, R5 is a hydrogen atom or a hydrocarbon group having 1 to 8 carbon atoms, R4 and R5 may be the same or different, and when the numbers of R4 and R5 are each two or more, each of R4 and R5 may be the same, may be partially the same, or may be all different; and $1 \le m \le 3$;

[Formula 3]

$$R6_pR7_qSi(OR8)_{4-p-q} \quad (3)$$

wherein R6 is a group containing a reactive group that can be chemically bound to other functional group, R7 is a hydrogen atom or a hydrocarbon group having 1 to 30 carbon atoms that may optionally contain a halogen group, R8 is a hydrogen atom or a hydrocarbon group having 1 to 8 carbon atoms, and when the numbers of R6, R7 and R8 are each two or more, each of R6, R7 and R8 may be the same, may be partially the same, or may be all different; and $1 \le p \le 3$, $0 \le q \le 2$, and $1 \le p+q \le 3$;

[Formula 4]

$$Si(OR9)_4 \quad (4)$$

wherein R9 is each a hydrogen atom or a hydrocarbon group having 1 to 8 carbon atoms, and when the number of R9 is two or more, each of R9 may be the same, may be partially the same, or may be all different; and

[Formula 5]

$$R10_rSiCl_{4-r} \quad (5)$$

wherein R10 is a hydrogen atom or a hydrocarbon group having 1 to 30 carbon atoms that may optionally contain a halogen group, and when the number of R10 is two or more, each of R10 may be the same, may be partially the same, or may be all different; and $0 \le r \le 3$.

9. The metallic pigment composition according to claim 2, wherein the organic oligomer or polymer is an acrylic resin and/or a polyester resin.

10. The metallic pigment composition according to claim 3, wherein the inorganic phosphoric acids are at least one selected from orthophosphoric acid, metaphosphoric acid, pyrophosphoric acid, triphosphoric acid, tetraphosphoric acid, and phosphorous acid, and wherein the inorganic phosphoric acid salts are salts of the inorganic phosphoric acids with at least one selected from alkali metals, alkaline earth metals, ammonia, and amines represented by the following general formula (6):

[Formula 6]

(6)

wherein R11, R12 and R13 may be the same or different, and are each a hydrogen atom, or a mono or divalent hydrocarbon group having 1 to 30 carbon atoms that may optionally contain an ether bond, an ester bond, a hydroxyl group, a carbonyl group, and a thiol group, R11 and R12 are optionally taken together to form a 5-membered or 6-membered cycloalkyl group, R11 and R12 are optionally taken together with a nitrogen atom to form a 5-membered or 6-membered ring that is capable of additionally containing a nitrogen or oxygen atom as a crosslinking member, or R11, R12 and R13 are optionally taken together to form a multi-membered multiring that is capable of containing one or more additional nitrogen atoms and/or oxygen atoms as a crosslinking member, and R11, R12 and R13 are not a hydrogen atom at the same time; and n represents a numerical value of 1 to 2.

11. The metallic pigment composition according to claim 3, wherein the acidic organic phosphoric or phosphorous acid esters are at least one or more selected from compounds represented by the following general formula (7):

[Formula 7]

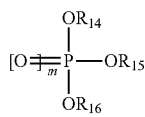

(7)

wherein R14, R15 and R16 may be the same or different, and are each a hydrogen atom, a hydrocarbon group having 1 to 30 carbon atoms that may optionally contain an ether group, an ester group, a hydroxyl group, a carbonyl group, and a halogen group, or a hydrocarbon group that may optionally contain a ring structure or an unsaturated bond, one or two of R14, R15 and R16 are a hydrogen atom, and the total number of carbon atoms of R14, R15 and R16 is 4 or more; and m represents a numerical value of 0 or 1;

and wherein the acidic organic phosphoric or phosphorous acid ester salts are salts of phosphoric acid esters represented by the following general formula (7) with at least one selected from alkali metals, alkaline earth metals, ammonia, and amines represented by the following general formula (6):

[Formula 8]

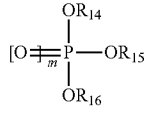

(7)

wherein R14, R15 and R16 may be the same or different, and are each a hydrogen atom, a hydrocarbon group having 1 to 30 carbon atoms that may optionally contain an ether group, an ester group, a hydroxyl group, a carbonyl group, and a halogen group, or a hydrocarbon group that may optionally contain a ring structure or an unsaturated bond, one or two of R14, R15 and R16 are a hydrogen atom, and the total number of carbon atoms of R14, R15 and R16 is 4 or more; and m represents a number of 0 or 1; and

[Formula 9]

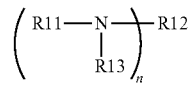

(6)

wherein R11, R12 and R13 may be the same or different, and are each a hydrogen atom, or a mono or divalent hydrocarbon group having 1 to 30 carbon atoms that may optionally contain an ether bond, an ester bond, a hydroxyl group, a carbonyl group, and a thiol group, R11 and R12 are optionally taken together to form a 5-membered or 6-membered cycloalkyl group, R11 and R12 are optionally taken together with a nitrogen atom to form a 5-membered or 6-membered ring that is capable of additionally containing a nitrogen or oxygen atom as a crosslinking member, or R11, R12 and R13 are optionally taken together to form a multi-membered multiring that is capable of containing one or more additional nitrogen atoms and/or oxygen atoms as a crosslinking member, and R11, R12 and R13 are not a hydrogen atom at the same time and n represents a numerical value of 1 to 2.

12. The metallic pigment composition according to claim 2, wherein a monomer constituting the organic oligomer or polymer is at least one selected from compounds represented by the following general formula (8):

[Formula 10]

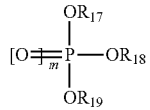

(8)

wherein R17, R18 and R19 may be the same or different, and are each a hydrogen atom, a hydrocarbon group having 1 to 30 carbon atoms that may optionally contain an ether group, an ester group, a hydroxyl group, a carbonyl group, and a halogen group, a hydrocarbon group that may optionally contain a ring structure or an unsaturated bond, or a group represented by the following general formula (9), one or two of R17, R18 and R19 are a hydrogen atom, one or two thereof are the following general formula (9), and the total number of carbon atoms of R17, R18 and R19 is 4 or more; and m represents a numerical value of 0 or 1:

[Formula 11]

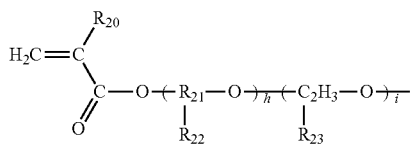

(9)

wherein R20 and R23 represent a hydrogen atom or a methyl group, R21 is a trivalent organic group having 2 to 8 carbon atoms that may optionally contain an oxygen atom, and R22 represents a hydrogen atom or the following general formula (10); and h represents a number of 0 or 1 and i represents a numerical value of 0 to 10:

[Formula 12]

—CH$^2$X  (10)

wherein X represents a hydrogen atom or a chlorine atom.

13. The metallic pigment composition according to claim 1, wherein the mixed-coordination type heteropolyanion compound is present in an amount of 0.01 to 10 parts by weight based on 100 parts by weight of the metallic particles.

14. The metallic pigment composition according to claim 1, wherein the hydrolysate of a silicon-containing compound and/or the condensate thereof is present in an amount of 0.01 to 50 parts by weight based on 100 parts by weight of the metallic particles.

15. The metallic pigment composition according to claim 2, wherein the organic oligomer or polymer is present in an amount of 0.01 to 50 parts by weight based on 100 parts by weight of the metallic particles.

16. The metallic pigment composition according to claim 3, containing at least one selected from the group consisting of (i) inorganic phosphoric acids or salts thereof; and (ii) acidic organic phosphoric or phosphorous acid esters or salts thereof in an amount of 0.01 to 20 parts by weight based on 100 parts by weight of the metallic particles.

17. A method for producing the metallic pigment composition according to claim 1, comprising mixing metallic particles with a mixed-coordination type heteropolyanion compound and a hydrolysate of a silicon-containing compound and/or a condensate thereof in the presence of a solvent in separate steps or in a single step.

18. The production method according to claim 17, comprising mixing the metallic particles with the mixed-coordination type heteropolyanion compound in the presence of a solvent, and then mixing the resulting mixture with the hydrolysate of a silicon-containing compound and/or the condensate thereof.

19. A method for producing the metallic pigment composition according to claim 2, comprising mixing metallic particles with a mixed-coordination type an organic molybdenum compound and a hydrolysate of a silicon-containing compound and/or a condensate thereof in the presence of a solvent in separate steps or in a single step, and then polymerizing or mixing an organic oligomer or polymer.

20. A coating composition comprising the metallic pigment composition according to claim 1.

21. An ink composition comprising the metallic pigment composition according to claim 1.

22. A coating film formed by the coating composition according to claim 20.

23. A printed material formed by the ink composition according to claim 21.

\* \* \* \* \*